United States Patent
Fetzer et al.

(10) Patent No.: US 7,652,752 B2
(45) Date of Patent: Jan. 26, 2010

(54) ULTRAVIOLET, INFRARED, AND NEAR-INFRARED LIDAR SYSTEM AND METHOD

(75) Inventors: Gregory J. Fetzer, Tucson, AZ (US);
David N. Sitter, Jr., Torrance, CA (US);
Douglas Gugler, Tucson, AZ (US);
William L. Ryder, Tucson, AZ (US);
Andrew J. Griffis, Tucson, AZ (US);
David Miller, Tucson, AZ (US); Asher Gelbart, Tucson, AZ (US); Shannon Bybee-Driscoll, Sahuarita, AZ (US)

(73) Assignee: Arete' Associates, Northridge, CA (US)

( * ) Notice: Subject to any disclaimer, the term of this patent is extended or adjusted under 35 U.S.C. 154(b) by 34 days.

(21) Appl. No.: 11/181,665

(22) Filed: Jul. 14, 2005

(65) Prior Publication Data
US 2007/0024840 A1 Feb. 1, 2007

(51) Int. Cl.
*G01C 3/08* (2006.01)
(52) U.S. Cl. .................. 356/4.01; 356/3.01; 356/3.1; 356/5.01; 356/5.1
(58) Field of Classification Search ....... 356/3.01–3.15, 356/4.01–4.1, 5.01–5.15, 6–22
See application file for complete search history.

(56) References Cited

U.S. PATENT DOCUMENTS

| 6,539,107 | B1 * | 3/2003 | Michael et al. ............. 382/154 |
| 6,597,437 | B1 * | 7/2003 | Kongable .................. 356/3.01 |
| 2002/0075472 | A1 * | 6/2002 | Holton ...................... 356/4.01 |
| 2006/0132752 | A1 * | 6/2006 | Kane ......................... 356/5.02 |

FOREIGN PATENT DOCUMENTS

WO    WO01/081949    *   1/2001

* cited by examiner

*Primary Examiner*—Thomas H Tarcza
*Assistant Examiner*—Luke D Ratcliffe
(74) *Attorney, Agent, or Firm*—Peter I. Lippman

(57) ABSTRACT

Pushbroom and flash lidar operations outside the visible spectrum, most preferably in near-IR but also in IR and UV, are enabled by inserting—ahead of a generally conventional lidar receiver front end—a device that receives light scattered from objects and in response forms corresponding light of a different wavelength from the scattered light. Detailed implementations using arrays of discrete COTS components—most preferably PIN diodes and VCSELs, with intervening semicustom amplifiers—are discussed, as is use of a known monolithic converter. Differential and ratioing multispectral measurements, particularly including UV data, are enabled through either spatial-sharing (e. g. plural-slit) or time-sharing.

46 Claims, 10 Drawing Sheets

ULTRAVIOLET, INFRARED, AND NEAR-INFRARED LIDAR SYSTEM AND METHOD

This document is based upon, and claims priority benefit of, International Application number PCT/US04/000949; and in turn upon and of its precursor, U.S. provisional patent application 60/440,303—which are both wholly incorporated by reference herein.

RELATED DOCUMENTS

Closely related documents are other, coowned U.S. utility-patent documents—also incorporated by reference in their entirety. Those documents are: Bowker et al., U.S. Pat. No. 6,400,396 (medical scale) and U.S. Pat. No. 5,467,122 (ocean scale), and Ser. No. 09/125,259 (wide range of scales); McLean et al., Ser. No. 09/390,487 (shallow angle); Gleckler et al., Ser. No. 10/258,917 (plural slit); and Griffis et al., Ser. No. 10/426,907 (without streak tube). Other patents and publications of interest are introduced below.

FIELD OF THE INVENTION

This invention relates generally to systems and methods for automatically detecting light reflected or scattered from an object, and determining distance to the object. Also found, in preferred applications of the invention, are other properties of the detected object—such as for example reflectance, velocity, and three-dimensional relationships among plural detected objects.

BACKGROUND a) Three-Dimensional Imaging

Some systems and methods for accomplishing these goals are conventional in the field of so-called "lidar", or "light detection and ranging"—analogous to the better-known "radar" that uses the radio portions of the electromagnetic spectrum. Because most lidar systems use pulsed lasers as excitation, the acronym "lidar" is sometimes said to instead represent "laser illumination detection and ranging".

In a lidar system, a sharp pulse of light is projected toward an object, or field of objects, that is of interest. The object or objects reflect—for turbid media a more descriptive term is "scatter"—a portion of this excitation radiation back toward the system, where the return radiation is time resolved.

As in radar, round-trip propagation times for the radiation form a measure of the distances, or ranges, from the apparatus to the respective objects. Radar, however, simply due to the much longer wavelengths it employs, cannot provide the resolution available with lidar.

High-resolution lidar imaging provides fully three-dimensional images of far higher resolution, on one hand, and that also have distinct advantages in comparison to common two-dimensional imaging (e. g. photographs) on the other hand. As compared with such ordinary two-dimensional images, some of the advantages provided by the additional range information are the ability to remove clutter, to accurately discriminate decoys from objects of real interest, and to provide additional criteria for detection and classification.

High-resolution three-dimensional imaging may provide volumetric pixel sizes of approximately 0.75 mrad by 0.75 mrad by 7.5 cm. Such imaging requires high bandwidth (2 GHz) lidar receivers with small instantaneous fields of view (IFOV) and many pixels in the two-dimensional imaging directions.

Key to these capabilities is effective and very fine time-resolution of the return optical signals—ordinarily by a streak tube, although modernly very fast electronics can be substituted in relatively less-demanding applications. Such applications particularly include measurements at the scale of ocean volumes, in which temporal resolution may be in meters rather than centimeters.

Finer work, especially including laboratory-scale measurement or ultimately medical ranging with resolution finer than a millimeter, appears to exceed current-day speed and resolution capabilities of electronics and accordingly calls for a streak tube. To use such a device for three-dimensional imaging, the laser pulses must be visible or shorter-wavelength light—so that the optical return pulse 21 (FIG. 1) from the object or objects is likewise visible or ultraviolet light 22. (While visible lidar excitation is hazardous because it damages the retina, shorter-wavelength excitation too is hazardous due to damage to the lens of the eye.) In either event, the optical return is made to take the form of a substantially one-dimensional image (i. e. slit-shaped, extending in and out of the plane of FIG. 1), or is reformatted 23 as such an image.

In response to that unidimensional optical input 22, in the form of visible or UV light, a photocathode screen 24 of the streak tube 18 forms a one-dimensional electronic image 25, which is refined by electron-imaging components 26 within the streak tube. (It will be understood that some very special streak-tube photocathodes have been developed to handle wavelengths other than visible; however, these are not at all commercial materials, and the use of some such photocathode technologies introduces synchronization problems and other drawbacks.)

Depending on any image reformatting that may be performed upstream of the streak tube 18, position along these unidimensional optical and electronic images 22, 25 may either represent location along a simple thin image slice of the object field, or represent position in a very complex composite, positionally encoded version of a two-dimensional scene. This will be explained shortly.

Within the streak tube, a very rapidly varying electrical deflection voltage 28, applied across deflection electrodes 27, sweeps 29 the one-dimensional electronic image 25 quickly down a phosphor-coated surface 31, forming a two-dimensional visible image on the phosphor screen. The sweep direction 29 then represents time—and accordingly distance, to each backscattering object—while the orthogonal direction on the screen (again, extending in and out of the plane of FIG. 1) represents position along the input optical image, whether a simple image slice or an encoded scene.

The patents mentioned above introduce considerable detail as to behavior and use of a streak tube. They also may represent the highest development of a form of lidar imaging familiarly known as "pushbroom"—because data are accumulated a little at a time, in thin strips transverse to a direction of motion.

Relative motion between the apparatus and the object field is provided, as for instance by operating the apparatus in an aircraft that makes regular advance over a volume of seawater, while laser-beam pulses are projected toward the water. The pulsed laser beam is formed into the shape of a thin fan—the thin dimension of the fan-shaped beam being oriented along the "track" (direction) of this relative motion.

In some laboratory-scale systems it is more convenient to instead scan an object or object field past a stationary lidar transceiver. Hence in either instance the broadly diverging wide dimension of the fan beam, often called the "cross-track" dimension, is at right angles to the direction of motion: this is the above-mentioned case of direct physical correspondence between the unidimensional optical or electronic image and a real slice of an object image. The Gleckler patent mentioned above, however, shows that two or more such one-dimensional images can be processed simultaneously—yielding a corresponding number of time-resolved pulse returns.

Each laser pulse thus generates at the receiver, after time-resolution of the return pulse, at least one two-dimensional snap-shot data set representing range (time) vs. azimuth (cross-track detail) for the instantaneous relative position of the system and object field. Successive pulses, projected and captured during the continuing relative motion, provide many further data frames to complete a third dimension of the volumetric image.

The resulting three-dimensional image can be visualized simply by directly observing the streak-tube phosphor screen, or by capturing the screen display with a CCD or other camera at the frame rate (one frame per initiating laser pulse) for later viewing. Another option is to analyze the captured data, e. g. in a computer, by any of myriad application-appropriate algorithms.

Alternative to pushbroom imaging is so-called "flash" lidar, represented by patents Re. 33,865 and U.S. Pat. No. 5,412,372 of Knight and Alfano respectively. Here the excitation pulse is ideally formed into a substantially rectangular beam to illuminate the entire object or object field at once.

The resulting backscatter pulse, correspondingly, is all time resolved concurrently—typically requiring, at least for a streak-tube, temporary mapping of the two-dimensional return into a one-dimensional (i. e. line) image that the tube can sweep. Such mapping, in the cited patents, is performed by a custom fiber-optic prism.

This sort of mapping may be done in a very great variety of ways. For example successive raster-equivalent optical-image slices can be placed end-to-end along the input photocathode, or individual pixels can be subjected to a completely arbitrary reassignment to positions along the cathode. Any mapping intermediate between these extremes is also possible.

After time-resolution if desired the data can be remapped to recover a multiplicity of original two-dimensional image-data frames—each now having its family of ranged variants. If preferred the full three-dimensional data set can be unfolded in some other way for analysis as desired.

b) The Wavelength Limitation

Streak-tube imaging lidar is thus a proven technology, demonstrated in both pushbroom and flash configurations.[1,2] Unfortunately, however, it is heretofore usable only in the visible-ultraviolet portion of the electromagnetic spectrum, whereas several important applications favor operation in longer-wavelength spectral regions.

A critical group of applications relates to so-called "eye safe" requirements for many operating environments. The human eye is extremely sensitive to visible radiation. Severe retinal damage can occur if someone is exposed to radiation transmitted by a conventional streak-tube lidar system.

In the near-infrared (NIR), by comparison, there is far less human sensitivity and likewise less risk. Maximum permissible exposure for NIR radiation at a wavelength of 1.54 µm is typically three orders of magnitude greater than at 532 nm. The main reason is that the lens of the eye does not focus NIR radiation onto the retina.

Consequently, in applications where humans might be exposed to the transmitted light, it is desirable to operate the lidar at the longer wavelength. In addition, radiation at 1.54 µm is invisible to the human eye, yielding the advantage of inconspicuous operation—which is desirable in many applications.

Limitation to the visible/UV is in a sense somewhat artificial, arising as it does merely from lack of a commercial streak tube with a photocathode sensitive to nonvisible radiation—even though NIR-sensitive photocathode materials exist.[3] The vendor neither produces streak tubes nor will provide the photocathode materials to streak-tube vendors. No streak-tube vendor is currently offering high-quantum-efficiency NIR streak tubes.

The near-infrared, however, is far from the only spectral region in which lidar operation would be very advantageous. The more-remote infrared portion of the electromagnetic spectrum (3 to 12 µm) overlaps strong absorption features of many molecules. As a result wavelengths in this region are particularly attractive for monitoring gaseous contaminant concentrations such as those encountered in atmospheric pollution or industrial process control.

$CO_2$ lasers operating at 9 to 11 µm can produce high power and have been deployed in space for a number of applications. As will appear from a later section of this document, the present invention is well suited for use with $CO_2$-laser-based imaging lidar systems.

Moreover, in other fields of optical measurement and analysis it is possible to make differential or ratio measurements—for example, differential absorption spectroscopy, and other analogous plural- or multispectral investigations. Heretofore this has not been practical in the lidar field, even for measurements comparing and contrasting measurements as between the visible and ultraviolet.

c) Other Technology not Heretofore Associated with Lidar

U.S. Pat. No. 6,349,016 of Larry Coldren is representative of advanced sophistication in a field previously related only to optical communications, optical switching and the like. To the best of the knowledge of the present inventors, that field has never previously been connected with lidar operations or any other form of three-dimensional imaging.

Tabulated below is other related work of Costello et al.[3] and Francis et al.,[7] as well as related commercial product literature.[8,9] These materials too are essentially representative of modern advances in optical switching and communications, unconnected with lidar.

d) Conclusion

As can now be seen, the related art fails to resolve the previously described problems of lidar unavailability for operation outside the visible wavelength region. The efforts outlined above, although praiseworthy, leave room for considerable refinement.

SUMMARY OF THE DISCLOSURE

The present invention offers just such refinement. The invention has major facets or aspects, some of which can be used independently—although, to optimize enjoyment of their advantages, certain of these aspects or facets are best practiced (and most-preferably practiced) in conjunction together.

In preferred embodiments of its first major independent facet or aspect, the invention is apparatus for detecting objects and determining their distance, to form a two-dimensional or three-dimensional image. The apparatus includes some means for receiving light scattered from the objects and in response forming a corresponding light of a different wavelength from the scattered light. For purposes of breadth and generality in discussing the invention, these means will be called simply the "receiving-and-forming means".

In less-formal portions of this document, the receiving-and-forming means will instead be called a "wavelength converter" (although the term "converter" may be semantically imprecise, as discussed later in this document). Hereinafter this phrase will be abbreviated "λC", using the lower-case Greek letter λ (lambda) that is the traditional symbol for wavelength.

The first aspect of the invention also includes some means for time-resolving the corresponding light to determine respective distances of the objects. Again for generality and breadth these means will be called the "resolving means".

The foregoing may represent a description or definition of the first aspect or facet of the invention in its broadest or most general form. Even as couched in these broad terms, however, it can be seen that this facet of the invention importantly advances the art.

In particular, inserting the receiving-and-forming means in advance of the time-resolving means can provide to the latter (e. g. a streak tube)—even if the scattered light is not visible light—substantially the same visible optical signal that would be obtained by receiving visible scattered light directly from the objects. The receiving-and-forming means thereby enable the external portions of the overall system to operate in almost any wavelength region; and can free the system from wavelength limitations of the time-resolving means. In this way the heretofore-intractable problems discussed above are substantially eliminated.

Although the first major aspect of the invention thus significantly advances the art, nevertheless to optimize enjoyment of its benefits preferably the invention is practiced in conjunction with certain additional features or characteristics. In particular, preferably the apparatus is further for use in determining reflectance of the objects; and the receiving-and-forming means include some means for measuring and recording gray-level information in the received and formed light.

Another basic preference is that the receiving-and-forming means include a first, optointermediate stage that receives the scattered light and in response forms a corresponding intermediate signal. Accordingly the receiving-and-forming means also include a second, intermedioptical stage that receives the intermediate signal and in response forms the corresponding light.

By the coined phrase "optointermediate stage" is here meant a subsystem that receives optical signals (the lidar return beam, in particular) and generates a corresponding signal in some intermediate domain—which may be electronic (in the present day, possibly the only practical such domain), or optical, or quantum-based, or a signal formed in yet some other medium. The phrase "intermedioptical stage" analogously describes a converse subsystem that receives and operates on that intermediate signal to generate the corresponding optical output.

If this basic preference of employing two stages that communicate through a common intermediate signal is observed, then two alternative subpreferences arise: preferably the intermediate signal includes either an optical signal or an electronic signal. Other subpreferences are that the time-resolving means include a streak-camera device; and that the system further include a light source, and some means for projecting pulses of light from the source toward the objects for scattering back toward the receiving-and-forming means.

If the system complies with the latter subpreference (inclusion of a source, with projecting means), then two alternative preferences are that the streak-camera device be incorporated into a repetitively pulsed pushbroom system, or into a flash lidar system. In the pushbroom case it is still further preferred that the system also include an aircraft or other vehicle transporting the receiving-and-forming means, and the streak lidar device as well, relative to the objects. (An alternative preference is the converse—i. e., that the apparatus be stationary and the scene made to move. In principle the pushbroom mode simply involves relative motion between the two.) Another preference is that the streak-camera device include a multislit streak tube.

Also in the case of the basic two-stage preference, it is further preferred that the intermediate signal include an electronic signal, the first stage include an optoelectronic stage, and the second stage include an electrooptical stage. In this event it is also preferred that the optoelectronic stage include light-sensitive semiconductor devices—and these devices in turn include photodiodes, e. g. PIN ("P-intrinsic") diodes, or alternatively avalanche photodiodes.

If this is so, then yet another nested preference is that the electrooptical stage include vertical-cavity surface-emitting lasers, or light-emitting diodes, connected to receive the electronic signal from the PIN diodes. An alternative is that the electrooptical stage include edge-emitting lasers, or quantum-dot lasers, or microelectromechanical systems—any of these devices being connected to receive the electronic signal from the PIN or other diodes. Although these output-stage preferences have been presented as nested subpreferences to the use of PIN or avalanche diodes, they are also preferred even if the input stage uses some other kind of photosensitive device.

Another basic preference is that the apparatus further include utilization means responsive to the time-resolving means. "Utilization means" are any means that utilize the resulting output information from the time-resolving means.

Preferably the utilization means are one or more of:
interpretive means for characterizing the objects based on the time-resolved light;
a monitor that displays an image of the objects for viewing by a person at the apparatus;
a monitor at a base station for reviewing the objects or related data received from the resolving by means by telemetry;
a data-processing device for analyzing the objects or images of them;
automatically operated interpretive modules that determine whether particular conditions are met;
announcement-broadcasting means or other automatic physical apparatus connected to operate in response to the time-resolving means;
means for enabling or denying access to secure facilities through operation of doors and gates, or access to computer systems or to financial services including but not limited to credit or banking; and
means for determination of hostile conditions, and resulting security measures including but not limited to automatically deployed area-sealing bulkheads.

Another basic preference is that the receiving-and-forming means include discrete arrays of light-sensing and light-producing components respectively. In this event it is further preferred that the receiving and forming means also include a discrete array of circuitry for controlling the forming means in response to the receiving means.

An alternative to these last-recited preferences is that the receiving and forming means include at least one monolithic hybrid of light-sensing and light-producing components. Here it is correspondingly preferred that the monolithic hybrid further include circuitry for controlling the forming means in response to the receiving means.

In preferred embodiments of its second major independent facet or aspect, the invention is a method for detecting and ranging objects. The method includes the step of receiving light scattered from the objects.

The method also includes the step of, in response to the scattered light, forming a corresponding light of a different wavelength from the scattered light. In addition the method includes the step of time-resolving the corresponding light to determine respective distances of the objects.

The foregoing may represent a description or definition of the second aspect or facet of the invention in its broadest or most general form. Even as couched in these broad terms, however, it can be seen that this facet of the invention importantly advances the art.

In particular this second, method facet of the invention closely parallels the first, apparatus aspect discussed above. It confers the same advantages over prior art, essentially transcending the wavelength limitations of current commercial streak tubes and thereby enabling lidar measurements to be made in the eye-safe near-infrared, for applications involving the likelihood of bystanders; or in the infrared or ultraviolet for the various other applications mentioned earlier.

Although the second major aspect of the invention thus significantly advances the art, nevertheless to optimize enjoyment of its benefits preferably the invention is practiced in conjunction with certain additional features or characteristics. In particular, preferably the method is further for use in determining reflectance of the objects; and the receiving and forming steps both preserve at least some gray-level (i.e. relative intensity) information in the scattered light. Most of the preferences introduced above with regard to the first aspect of the invention are equally applicable to the second aspect now under discussion.

Another basic preference (also applying to the first two facets of the invention) is that the receiving step receive return light in plural wavelength bands, and the forming step form the corresponding light in substantially one common band. If this plural-band preference is observed, it is further preferred that the bands include at least one UV wavelength; and then a still further nested preference is that they include at least one NIR wavelength. (These choices exhibit distinct abilities of the invention; in practice, spectral regions are chosen based on physics to extract unique object data.)

Two other alternative basic preferences are that the receiving step include receiving the plural wavelength bands at (1) plural slits, respectively, of a plural-slit streak camera, and (2) plural times, respectively. In the first of these cases it is further preferred that the method also include the step of, before the receiving step, transmitting light in said plural wavelength bands, substantially simultaneously, toward the objects. In the second of the just-stated two cases it is instead further preferred that the receiving step include transmitting the plural wavelength bands at plural times, respectively.

Yet another basic preference is that the method also include the step of deriving plural signals from the received light in the plural wavelength bands, respectively. Accordingly the method preferably also includes the step of finding differences or ratios between signals received in the plural wavelength bands.

In preferred embodiments of its third major facet or aspect, the invention is apparatus for detecting objects and determining their distance and reflectance, to form a two-dimensional or three-dimensional image; the apparatus includes a light source; and means for projecting pulses of light from the source toward the objects for scattering back toward the receiving-and-forming means;

means for receiving light scattered from the objects and in response forming a corresponding light of a different wavelength from the scattered light, preserving gray-level information in the received and corresponding light; and means, including a streak camera, for time-resolving the corresponding light to determine respective distances and reflectances of the objects;

wherein the receiving-and-forming means include:

a first, optoelectronic stage, including an array of light-sensitive PIN diodes, that receives the scattered light and in response forms a corresponding electronic signal;

a second, electrooptical stage, including an array of vertical-cavity surface-emitting lasers connected to receive the electronic signal from the PIN diodes, that receives the electronic signal and in response forms the corresponding light; and an electronic circuit array connecting the electronic signal from the first stage to the second stage, and modifying the signal to operate the second stage.

The foregoing may represent a description or definition of the third aspect or facet of the invention in a broad and general form. Even as couched in these broad terms, however, it can be seen that this facet of the invention importantly advances the art.

In particular, though not wholly independent of the first aspect presented earlier, this facet of the invention aggregates several preferences that may be particularly synergistic. Without in the least denigrating the individual aspects and preferences discussed above, the aggregated system of the third aspect is believed to be especially advantageous in short-term manufacturability and overall practicality.

Although the third major aspect of the invention thus significantly advances the art, nevertheless to optimize enjoyment of its benefits preferably the invention is practiced in conjunction with certain additional features or characteristics. In particular, preferably the streak lidar device is incorporated into a repetitively pulsed pushbroom system. In this case it is further preferable to include in the apparatus an aircraft or other vehicle transporting the receiving-and-forming means and the streak lidar device relative to the objects—and also to include utilization means responsive to the time-resolving means.

It is to be understood that the foregoing enumerations of preferences for the three aspects of the invention are intended to be representative, not exhaustive. Accordingly many preferred forms of the invention set forth in the following detailed description or claims are within the scope of the present invention though not introduced above.

All of the foregoing operational principles and advantages of the invention will be more fully appreciated upon consideration of the following detailed description, with reference to the appended drawings, of which:

DETAILED DESCRIPTION OF THE PREFERRED EMBODIMENTS

Figure 1:
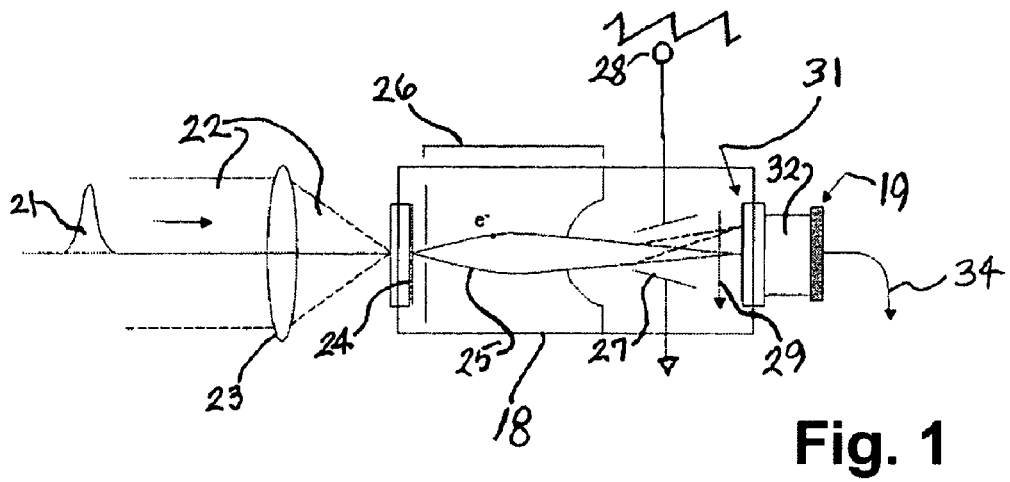
FIG. 1 is a block diagram of a streak tube in operation, shown together with a CCD camera and an output-data connection—symbolizing processing and utilization means—that all together form a streak-tube imaging lidar ("STIL") camera.

In preferred embodiments, the invention provides a low-cost alternative to visible-light lidar. NIR radiation pulses can be projected toward objects, and the returned NIR pulses 8 (FIG. 2) converted, at the receiver, into pulses 22' at a visible wavelength.

This visible radiation 22' is then directed into a streak tube 18, effectively emulating the visible light 22 (FIG. 1) entering a streak-tube system conventionally. The remainder of the operation is closely analogous to generally conventional operation of the streak tube, excepting only possible effects of positional quantization along the slit direction—and the result is a streak-tube lidar receiver operable for NIR applications.

In principle a number of techniques could be used to accomplish the wavelength conversion. It is possible to use nonlinear optical techniques such as Raman scattering, stimulated Raman scattering, and harmonic frequency generation to achieve wavelength conversion. Each of these techniques, however, requires relatively complex optical schemes; and generally the conversion efficiency is strongly dependent on the intensity of the light at the converter.

Such dependence is usually a prohibitive condition at a lidar receiver, where the return signals are ordinarily small (on the order of picowatts). In addition, it is difficult to obtain large wavelength translations, particularly in the direction of increasing energy per output photon.

In some instances it is possible to provide optical gain at the receiver to improve the efficiency of the wavelength conversion. Such techniques, however, greatly increase the complexity and cost of the receiver.[4]

It is possible to instead accomplish a kind of wavelength "conversion" electronically. Here the term conversion is somewhat more figurative than in, for example, nonlinear optical techniques—for the present technique does not change wavelength of particular light to another wavelength of virtually the same light.

Rather, in preferred embodiments particular light 8 of one wavelength drives an intermediate optoelectrooptical stage 13-17 (FIG. 2) that generates corresponding light 22' of another wave-length. This approach uses detectors 13, amplifiers 14, 15, and emitters 16 already developed for other applications—particularly optical telecommunication or optical switching.

These established technologies, mentioned in subsection c) of the "BACKGROUND" section in this document, include development and marketing of discrete components[4, 7-9]—as well as monolithic (common-epitaxy) systems introduced in the Coldren patent. They appear to have never before been associated with lidar or other three-dimensional measurements.

Nevertheless they are well suited to developing an electronic wavelength "converter" (herein abbreviated "λC" as noted earlier) We have built and demonstrated just such a converter, integrated into a high-bandwidth, high-quantum-efficiency streak-tube lidar receiver. The bandwidth of the system excluding the converter is into the terahertz range, or over 1 GHz considering the response limitations of the converter itself.

Near-infrared light 8 from the object field actuates the λC, which responds by passing visible light 22' to the streak-tube 18: (1) the visible line image 22' of the backscattered light is formed, as in the conventional system, on a slit in front of the streak-tube photocathode 24 (FIG. 1), bringing about a corresponding line image 25 of photoelectrons within the tube that is accelerated toward the anode end 31 where the phosphor lies.

(2) The photoelectrons e⁻ are electrostatically deflected 29 across or down the phosphor, at right angles to the linear dimension, forming a two-dimensional image on the phosphor—which responds by generating a visible image that is very nearly identical geometrically. These electronic and visible images have spatial (line-image axis) and temporal (deflection/sweep axis) dimensions.

Finally (3) a CCD camera 19 captures 34 the visible two-dimensional image formed, or a human operator directly views the phosphor screen. Typically, the third dimension is captured as described earlier—i. e., either in pushbroom mode (by repetitively pulsing the laser, while providing relative motion between the scene and the sensor platform[5, 6]) or in flash mode (by premapping a full two-dimensional scene into a composite line image, and time-resolving that composite image).

Thus the far-reaching objective of this invention is to provide a compact, imaging lidar receiver that operates in the near-IR region of the spectrum and provides high-resolution three-dimensional imagery. The receiver combines a patented streak-tube imaging lidar ("STIL") receiver from Areté Associates, of Sherman Oaks, Calif., with a complementary receiver front end that accomplishes the figurative conversion of near-infrared (NIR) light to a visible wavelength.

The result is a lidar receiver that can operate at wavelengths outside the range of the streak-tube photocathode sensitivity, yet provide imagery that is similar to that currently available with the visible-wavelength STIL systems.

a) An Electronic λC

Conventionally the backscattered laser return is focused through a slit on the streak-tube faceplate prior to imaging on the photocathode 24. Placing the λC at this position and converting near-infrared light 8 to visible 22' enables the streak tube 18 to be used for NIR applications.

A linear array (FIG. 2) of high-bandwidth photodetectors 13 (e. g. PIN InGaAs) is placed at the image plane, i. e. slit entrance to the streak tube 18.

For each photodetector element the photodetector current is amplified and converted to a voltage signal by a transimpedance amplifier 14. The output of the amplifier drives a vertical cavity surface-emitting laser (VCSEL) 16 that emits in the visible region of the spectrum. The VCSEL radiation 22' is incident on the photo-cathode of the streak tube, and the operation of the streak tube is as described in the earlier "BACKGROUND" section of this document—in subsection "a)" of that section.

Other embodiments of this invention allow input operation at other wavelengths, merely by replacement of the InGaAs modules with detectors 13 sensitive to the wavelengths of interest—for example InSb or PbSe for two to four microns, or HgCdTe for five to fifteen microns. Also for UV operation, Si detectors are appropriate.

At the output (streak-tube input) end of the λC subsystem, for economy the output generators 16 can be LEDs rather than VCSELs. Such a substitution is expected to inflict no more than a loss in sharpness due to optical crosstalk at the output, and at most some degradation of temporal response (i. e., it is possible that there will be no temporal degradation at all).

b) Component Selection

InGaAs photodetectors 13 used for telecommunications provide high quantum efficiencies and sufficient bandwidth to serve in this application. The technology is quite mature, and large arrays of detectors are commercially available.

It is possible to obtain arrays of receivers, which include the detector 13 and individually addressable transimpedance amplifiers 14. Therefore provision of this component is not limiting.

Figure 2:
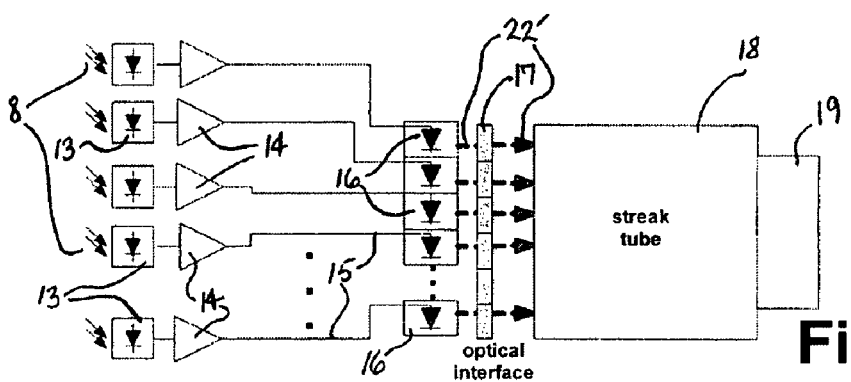
FIG. 2 is a schematic diagram of a multipixel wavelength converter ("λC")
Figure 4:
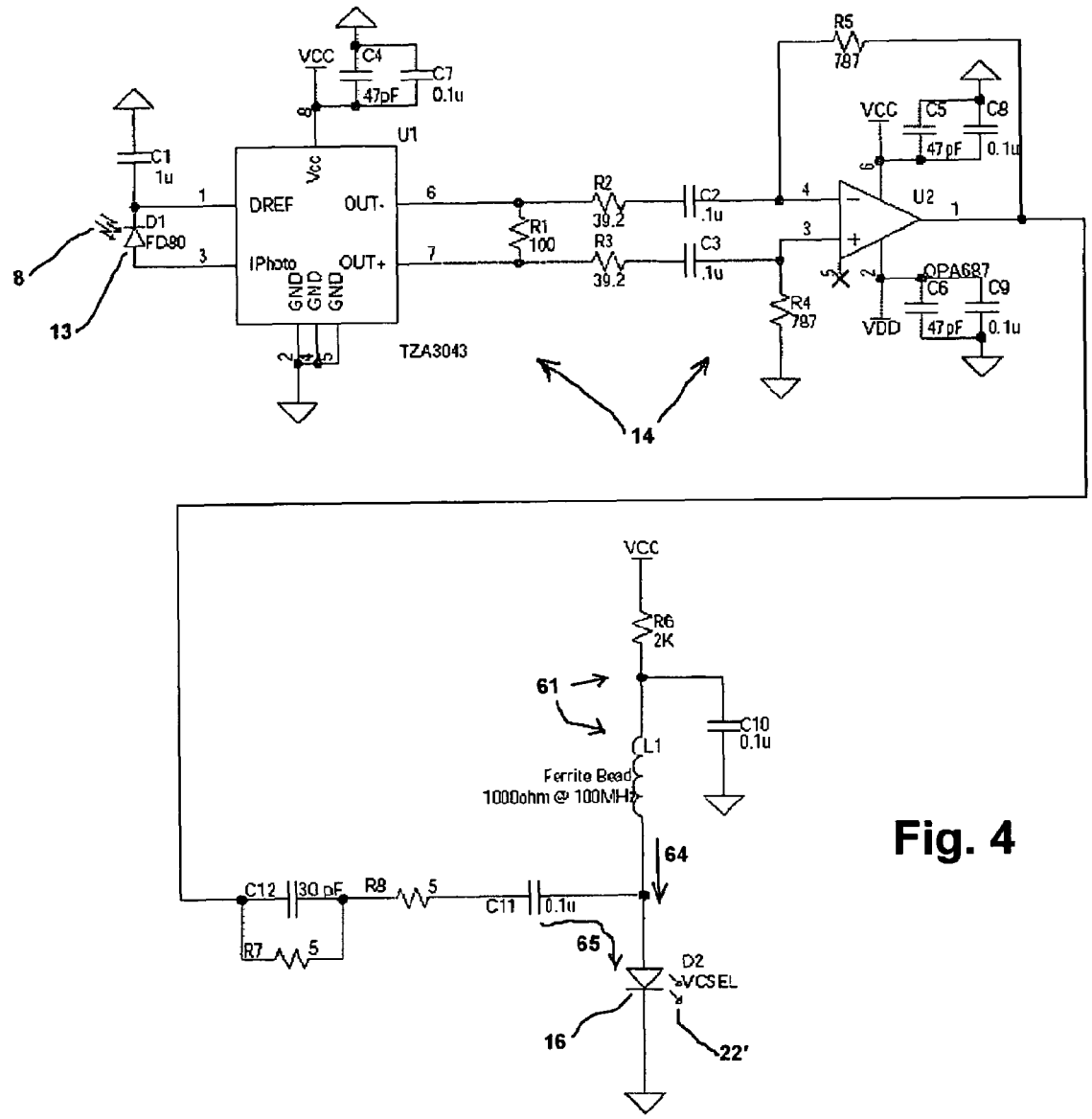
FIG. 4 is a single-channel λC.
Figure 5:
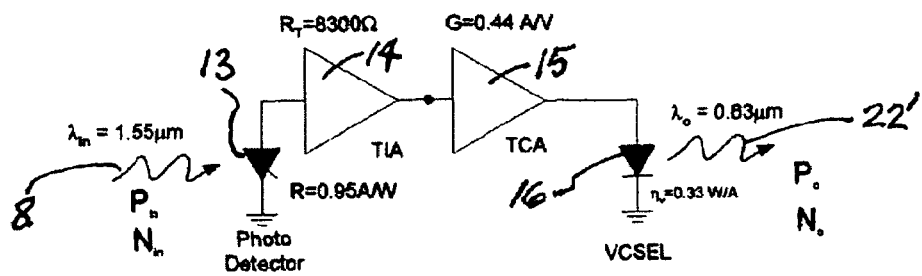
FIG. 5 is a λC block diagram used for the purpose of estimating the conversion efficiency of the system shown in FIG. 4.
Figure 6:
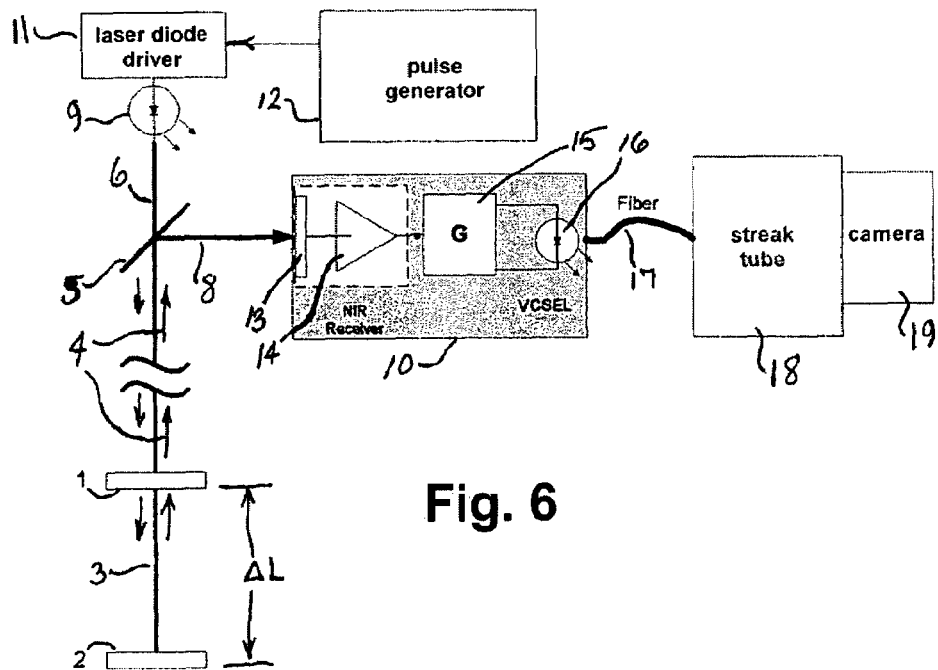
FIG. 6 is an optical-bench layout used to validate the performance of the λC.

The one-dimensional photodiode array is input to an array of transimpedance amplifiers (TIAs) 14 that drives an array of amplifiers 15 (FIGS. 4 through 6). The signal is then transmitted to the vertical cavity surface emitting laser (VCSEL) array 16 and captured by a conventional streak-tube/CCD camera 18, 19 (FIGS. 1, 2 and 6).

Vertical-cavity surface-emitting lasers (VCSELs) have been selected for the output stage because of their bandwidth and because they are inherently fabricated in array formats. VCSELs are unique, in comparison to other diode lasers, in that they emit from the surface of the structure rather than from the edge. Consequently, they are by nature grown in arrays, and microlens optical arrays 17 can be integrated directly onto the devices—facilitating collimation of the output. A like attachment process may be available for light-emitting diodes.

c) Component Assembly

Complex electrical contacts required to support a large array of VCSELs can be formed through so-called "flip-chip bump bonding". This is detailed e. g. by Amkor Technology, Inc. (at www.amkor.com/enablingtechnologies/FlipChip/index.cfm) generally as follows.

It is a method of electrically connecting a die to a package carrier. The package carrier, either substrate or leadframe, then provides the connection from the die to the exterior of the package.

In "standard" packaging, interconnection between a die and a carrier is made using wire. The die is attached to the carrier, face-up; next a wire is bonded first to the die, then looped and bonded to the carrier. Wires are typically 1 to 5 mm in length, and 25 to 35 μm in diameter.

In flip-chip packaging, the interconnection between the die and carrier is instead made through a conductive so-called "bump" that is formed directly on the die surface. The bumped die is then inverted ("flipped over", in packaging parlance) and placed face-down, with the bumps connecting to the carrier directly. A bump is typically 70 to 100 μm tall, and 100 to 125 μm in diameter.

The flip-chip connection is generally formed with one of two attaching media: solder or conductive adhesive. By far the more common material is the solder, in either eutectic (63% Sn, 37% Pb) or high-lead (97% Pb, 3% Sn) compositions; and solder interconnect is used in the initial flip-chip products that Amkor has brought to market.

The solder-bumped die is attached to a substrate by a solder-reflow process, very similar to the ball-grid array (BGA) process in which solder balls are attached to a package exterior. After the die is soldered, the remaining voids between the die and the substrate—surrounding the solder bumps—are filled with a specially engineered epoxy called "underfill".

That material is particularly designed to control stress in the solder joints caused by the difference in thermal expansion between the silicon die and the carrier. Once cured, the underfill absorbs that stress, reducing the strain on the solder bumps and thereby greatly increasing the life of the finished package.

The chip-attachment and underfill steps are the elements of flip-chip interconnection. Beyond this, as the Amkor presentation concludes, the remainder of package construction surrounding the die can take many forms and can generally utilize existing manufacturing processes and package formats.

d) Leveraging Technologies

Analogous features between lidar operation and free-space communication allow technical developments in the latter potentially large market to benefit the far smaller but important lidar remote-sensing market. VCSELs form a key element of today's free-space communications thrust.

Physical characteristics of VCSELs are well suited to solving the λC/STIL problem. First, individual VCSEL structures are small (about 3 to 10 μm) although they typically have a high beam divergence unless the output is coupled into a microlens.

Addition of a lens array 17 (FIG. 2) results in a structure with pitch between 100 and 250 μm. A VCSEL array with 200-μm pitch can be coupled into the streak tube through a three-to-one fiber taper (also at 17), providing two hundred fifty-six cross-track pixels on a standard-size (12.3 mm) CCD chip—assuming a streak-tube magnification of 0.7, which is common.

Secondly, VCSEL emission wavelengths can be tailored to match the response peak of the streak-tube photocathode. VCSEL output wavelengths between 600 and 850 nm are easily achievable—with AlGaAs/GaAs or InGaAs/GaAs materials and standard molecular-beam epitaxy techniques. Arrays of up to a thousand elements have been manufactured[7], and several companies offer commercially available custom arrays[8, 9].

e) Design Considerations and Drive Circuitry for VCSELs

From a plot of typical VCSEL output power as a function of input current, it is seen that VCSELs have a distinct lasing threshold 41 (FIG. 3) that must be overcome to obtain significant light output. In our λC, when a VCSEL should be quiescent a bias-current circuit 61 (FIG. 4) supplies the VCSEL with electrical current 64 held just below that threshold.

Figure 3:
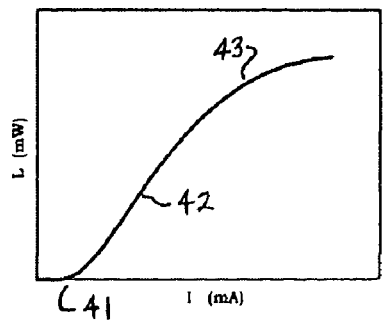
FIG. 3 is a typical light-output vs. drive-current ("L-I") characteristic of a VCSEL.

When the lidar return strikes the associated receiver element 13, drive electronics 14 provide an amplified photocurrent 65 which is added to the quiescent-state current 64. The sum, i. e. the VCSEL total drive current, then exceeds the threshold 41 (FIG. 3).

The light/current relationship 42 is very linear from the turn-on point and up toward the region of saturation 43—accordingly providing nearly linear response to intensity of the lidar return. This characteristic is important where contrast or intensity information in the lidar imagery may provide significant discrimination capabilities. Particularly good examples are polarimetric lidar applications, in which maintaining contrast information is critical.

Our prototype incorporates VCSEL drive circuitry 14 (FIG. 4) that provides ample bandwidth and gain to allow operation of a single-pixel lidar system. The electronics required to drive the VCSEL elements are quite simple.

We have built one configuration (FIG. 4) and confirmed that it achieves desired operation for twelve pixels when linearly replicated. In a production configuration this becomes in essence one unit of a custom large-scale integrated circuit that provides throughput for the two hundred fifty-six channels. Unlike near-IR streak-tube photocathode material, this technology is readily available.

f) Estimate of Converter Efficiency

A theoretical analysis (see below) of the converter efficiency for a particular form of our apparatus provides a foundation for use of the invention more generally. Conceptually, a minimum operational value is roughly 0.36 just to conserve the energy of the input photons.

InGaAs photodiodes have an extremely high quantum efficiency in comparison with a streak-tube photocathode. Therefore noise characteristics at the input end 13 of our λC are in our favor; and any gain that can be applied before the newly generated visible light 22' reaches the photocathode 24, without adding significant noise, is advantageous.

The invention does involve some tradeoffs. An advisable production configuration will have two hundred fifty-six channels, in a device of suitable size to couple with a streak tube; this configuration places many operational amplifiers 14, 15 in a small space.

Accordingly power consumption and physical space must be balanced against the gain-bandwidth product. The solution here is a simple configuration that provides arbitrary but significant gain, and that is readily reduced to an integrated-circuit implementation.

We have modeled λC performance as described above. For purposes of such modeling, commercially available components were considered: an InGaAs PIN photodiode 13 (FIG. 5), a transimpedance amplifier 14 and transconductance amplifier 15, and finally a VCSEL 16 emitting 22' at 630 nm. The λC device is capable of high gain. Equation 1 shows that the number of photons emitted per incoming photon is high. (FIG. 5 identifies the variables in this equation.)

$$\frac{N_0}{N_1} = \frac{\lambda_0}{\lambda_1} RR_T G \eta_v = 465 \tag{1}$$

The high conversion efficiency more than compensates for the inherent energy deficit in the transition from NIR to visible wave-lengths. The large transimpedance resistance dominates the conversion efficiency.

While conversion efficiency is an important factor, signal-to-noise ratio (SNR) is also critical. A model has been developed to compute the SNR of the wavelength converter.

Noise sources include background radiation ($P_b$), dark current ($I_D$), detector shot noise, and the respective amplifier noise terms for the transimpedance and transconductance amplifiers ($\sigma_T^2$, $\sigma_G^2$) For practical purposes, Equation 2 approximates the SNR for a receiver with bandwidth B.

$$SNR = \frac{P_i RR_T}{\sqrt{[2eB(I_D + R(P_i + P_b)) + \sigma_T^2 B]R_T^2 + \sigma_G^2 B}} \tag{2}$$

Figure 22:
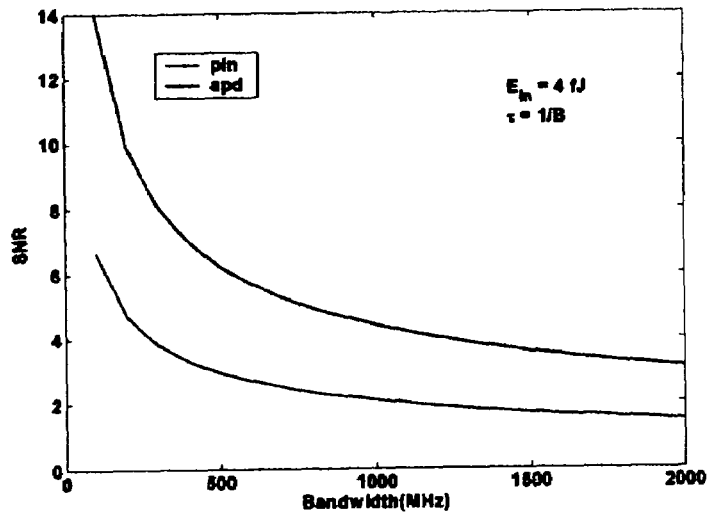
FIG. 22 is a graph of predicted λC signal-to-noise ratio for two different types of detectors, namely P-intrinsic diodes and avalanche photodiodes.

Gigahertz-bandwidth operation of the λC is imperative if the system is to be used in lidar systems with resolution requirements on the order of 25 cm or less. Using Equation 2, the SNR at the output of the λC has been computed and plotted (FIG. 22) as a function of bandwidth for an InGaAs PIN and avalanche photodiodes (APD), and incident energy on the photodetector of 4 fJ. In the case of the APD, Equation 2 was modified to reflect the gain of the device as well as the excess noise.

The laser pulse width was varied inversely to the bandwidth of the λC. For comparison, the lower detectable laser energy for typical STIL receivers is approximately 1 fJ/pixel. Thus, use of InGaAs APD's in the λC will allow SNR performance at 1.5 μm nearly identical to that of STIL receivers operating at 532 nm.

Results of the simulation suggest that the λC will provide adequate SNR to be used in conjunction with the streak tube. The PIN photodiode is adequate for all but the most demanding applications, and the APD can be used to achieve improved SNR at high band-widths or under low-return-energy conditions.

The dominant noise factor in the λC is the transimpedance amplifier. Note that the amplifier considered here is a commercial, off-the-shelf ("COTS") item whose design can be improved. The high transimpedance resistance and the inherent noise in the amplifier can be traded off to some extent.

Figure 23:
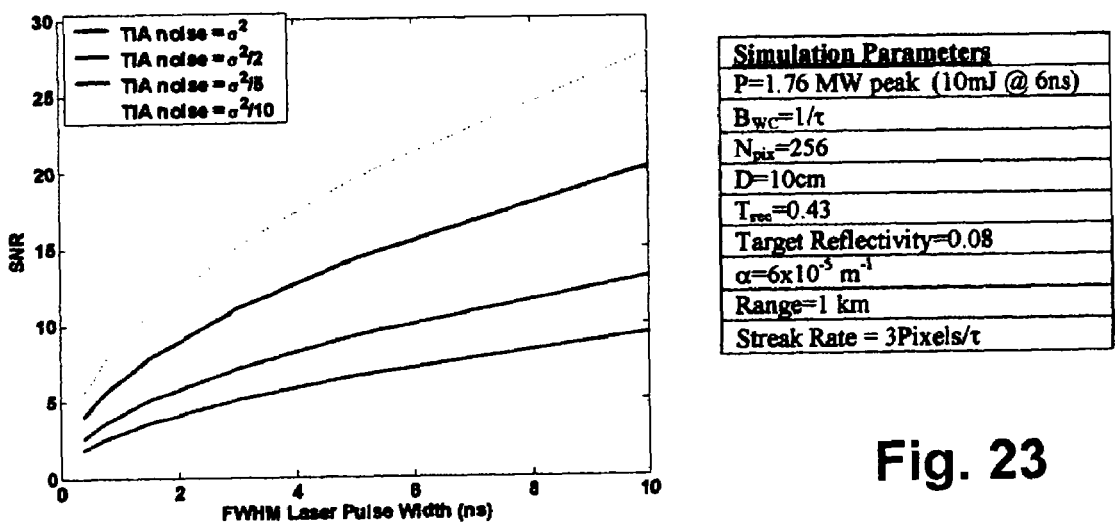
FIG. 23 is a graph showing predicted signal-to-noise ratio for an overall STIL receiver according to the invention, incorporating the performance of the λC (here D is the receiver collection aperture diameter, $T_{rec}$ is the receiver transmission efficiency, and α is the atmospheric attenuation coefficient.

A simulation of the λC incorporated into a STIL receiver was completed and the results plotted (FIG. 23). In this case, the peak power transmitted was held constant and the laser pulse width was varied to determine the effect on SNR. This simulation establishes that the invention can meet demanding range-resolution requirements for detection and identification.

The simulation assumes a transmitter at 1.5 pm and PIN photodiodes as the detectors in the λC. Various other simulation parameters are tabulated (FIG. 23, in which D is the receiver collection aperture diameter, $T_{rec}$ the receiver transmission efficiency, and α the atmospheric attenuation coefficient)—but it is important to note that the bandwidth of the λC was varied inversely with the laser pulse width, and the streak rate of the electron beam in the tube was maintained at three CCD pixels per laser pulse. The data shown are parametrized by the TIA noise factor; reducing the power spectral density of the TIA yields significant dividends.

The simulation predicts that reducing the TIA noise power spectral density by a factor of ten will increase the SNR by approximately a factor of three. Again the simulation indicates that optimization of the TIA is a key component of future work on the λC.

g) Single-element λC Prototype Preparation and Operation

To characterize and understand the key performance issues for the λC, we built and operated a single-pixel prototype, for one pixel in the receiver focal plane. A λC with a large number of pixels is instead a highly specialized ensemble of integrated circuitry, most-preferably packaged as a hybrid multichip module.

The VCSEL in our prototype is a Honeywell SV3644-001 discrete element. Technical specifications of interest for this VCSEL are: 673 nm output, 2 V threshold voltage and 2 mA threshold current.

It can be driven above threshold in short-pulse low-duty-cycle mode from 2 to 100 mA, leading to a 0.01 to 1 mW peak output power range. The receiver module is an InGaAs PIN from Fermionics model number FRL 1500. The VCSEL drive circuitry used (FIG. 4) is discussed in subsection e) above.

The prototype took the form of an optical-bench setup using primarily COTS components, including a 1.55 μm laser diode 9 (FIG. 6) to generate excitation pulses 6, a signal generator 11 and diode driver 12 for powering those laser pulses, and our high-bandwidth λC 10. The test investigated the capabilities and limitations of the λC, and also used that module in conjunction with a streak tube 18 and camera 19 to demonstrate relative range measurements.

The optical bench setup (FIG. 6) is assembled so that a laser pulse 6 traveling from the 1.55 μm laser diode 9 through a beam splitter 5 reflects from one of two plane mirrors 1, 2 mounted on the bench. A portion of the NIR reflected return light 4, redirected by the splitter 5, is incident on the input detector 13 of the λC 10. The resulting VCSEL output is projected through a short fiber-optic coupler 17 onto the faceplate of the streak tube 18.

h) Bandwidth

Figure 7:
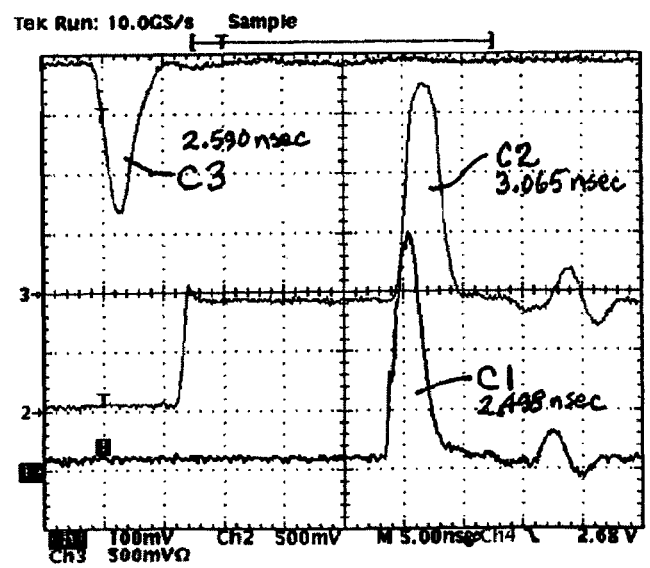
FIG. 7 is a group of oscilloscope traces corresponding to various signals in the λC.

Our first determination, using the apparatus, was the bandwidth of the λC itself. In this measurement the width of the pulse C3 (FIG. 7) from the signal-generator 12 was varied from 16 to 2.6 nsec while observing the relative pulse shapes of the output current waveform C1 from the receiver 13, 14 and the current drive waveform C2 into the VCSEL 16, using a digital oscilloscope (not shown).

That set of three oscilloscope traces was recorded with the signal-generator pulse width set to 2.6 nsec. The three waveforms have a similar shape, and evidence no significant temporal dispersion as the signal passes through the various stages of the λC.

The pulse generator is not capable of producing pulses shorter than 2.6 nsec, but these observations nevertheless demonstrate directly that the invention achieved a bandwidth of ~400 MHz very easily—and, by visual interpolation of the screen waveforms, also accomplished a bandwidth extension into the gigahertz regime.

Measurements of the same waveform pulse widths taken during this demonstration, over the above-stated range of signal-generator pulse widths, were tabulated and plotted.

Figure 8:
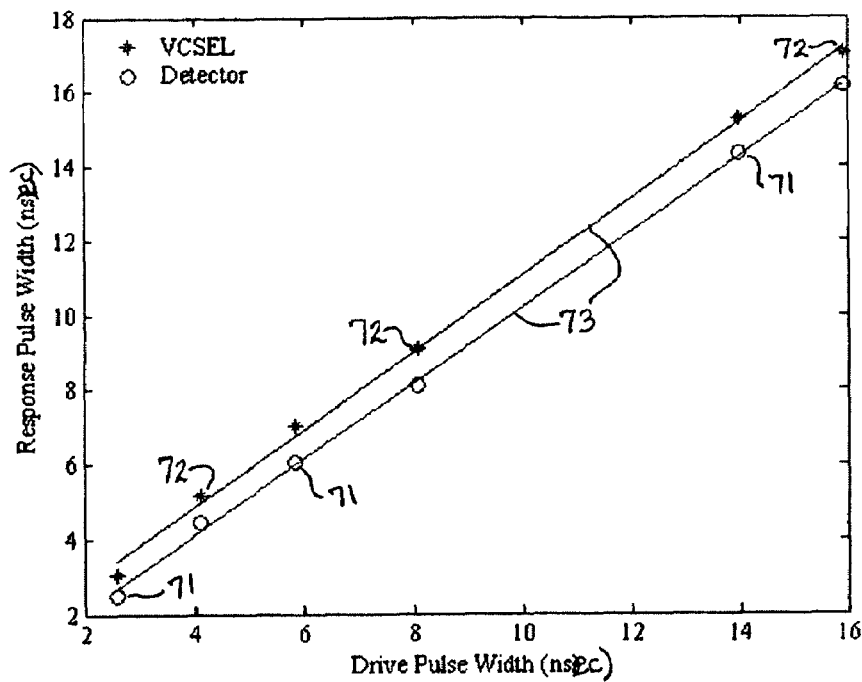
FIG. 8 is a plot of the receiver and VCSEL output-waveform pulse widths as a function of the drive pulse width (the symbols representing the data points collected during the experiment, and the solid lines representing least-squares-error linear fits to the data)

The pulse widths 71 (FIG. 8) at the receiver 13, 14, and also the pulse widths 72 at the VCSEL output—i. e., both of the λC test points—linearly track the width of the drive pulse, indicating that the bandwidth of the converter is not a limiting factor. Thus the λC is an excellent match to the already demonstrated high temporal resolution of the streak-tube lidar receiver.

i) Relative Range Measurement

With the infrared signal converted to visible light, the output was next used to actually create streak-tube lidar imagery. Our apparatus reliably and reproducibly measured relative ranges established by manipulation of the mirrors 1, 2 on the test bench.

Using the same experimental arrangement discussed above (FIG. 6), a set of streak-tube images was captured and recorded by the CCD camera at the back of the streak tube. During the first demonstration, light from a single laser shot was allowed to reflect 4 from a near mirror 1 (FIG. 6) and pass through the λC and on to the streak-tube/CCD system.

During the second capture, mirror 1 was removed and the light was instead reflected at a far mirror 2 (positioned ΔL=71 cm behind the near mirror 1). The resulting lidar images include a bright flash 81 (FIG. 9) corresponding to reflection from mirror 1, and another such flash 83 (FIG. 10) corresponding to that from mirror 2.

The flash 81 from the near mirror 1 is much closer to the origin of time coordinates (the bottom of the image) than the flash 83 from the far mirror 2. This relationship makes clear that the system is able to detect a range difference from the two signals.

Figure 10:
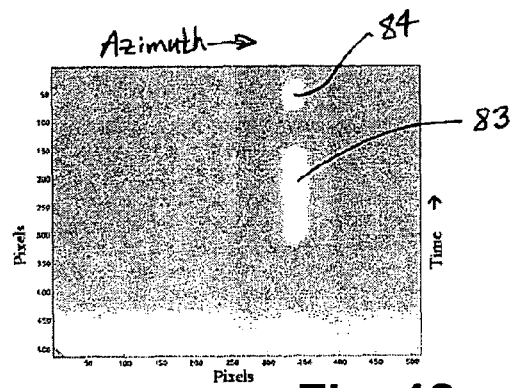
FIG. 10 is a like image of pulse return from mirror 2.
Figure 11:
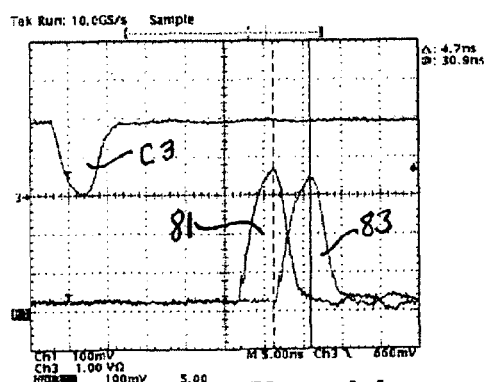
FIG. 11 is an oscilloscope screen capture showing the laser drive pulse (top) with the corresponding pulse returns from mirror 1 (left pulse, below) and mirror 2 (right)

The same information is revealed by displaying both pulse returns 81, 83 (FIGS. 9 and 10) from the near and far mirrors 1 and 2 together in an oscilloscope-screen trace (FIG. 11). The time difference between the two pulses is measured at 4.7 nsec, precisely the time it takes light to travel the 2ΔL=142 cm round-trip differential for the 71-cm mirror separation.

Figure 9:
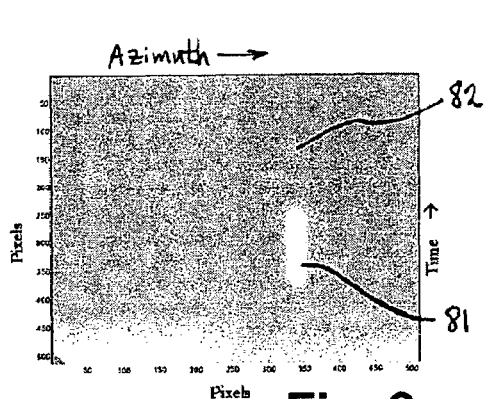
FIG. 9 is a lidar image of pulse return from mirror 1 (FIG. 6), with time on the vertical axis—increasing upward.

Since the VCSEL is operated at its threshold limit, and with the signal generator working close to its operating limitations, any undesirable ringing in the drive circuitry causes the VCSEL current to rise, only instantaneously, above the threshold—releasing a small pulse of light. This small pulse is detectable by the streak-tube camera and appears in the lidar images as a smaller, dimmer pulse 82, 84 (FIGS. 9 and 10).

Figure 12:
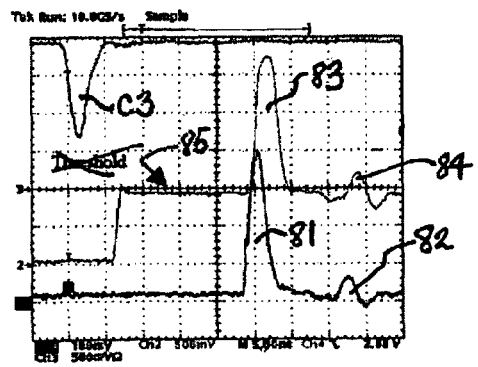
FIG. 12 is a like oscilloscope screen capture showing the noise created by the signal generator—producing the second, smaller pulse seen in the lidar imagery, the bottom line being pulse return from mirror 1, and the central line that from mirror 2.

The same is seen also in the screen capture, with the 'scope set to offset the main traces 81, 83 (FIG. 12) vertically—and also to shift one of those traces to roughly align temporally (horizontally) with the other. The trace 83 due to reflection at mirror 2 was set with its VCSEL threshold level 85 just at the oscilloscope horizontal centerline. The spurious pulses appear as smaller shallow peaks 82, 84 trailing the primary pulses 81, 83 respectively. Minor trimming refinements to the λC suppress the resonances responsible for this undesired effect.

j) Conceptual Notes on the Twelve-pixel Implementation and Testing

A multichannel λC that we built and tested consists of the original single-channel circuit replicated twelve times. The single-element InGaAs photodetector has been replaced with a twelve-channel InGaAs photodiode array (Fermionics P/N FD80DA-12).

The array has a 250 μm pitch between detector elements; otherwise the element size, spectral response and sensitivity are all identical to the original InGaAs diode. Care was taken during the board layout to ensure line lengths were kept uniform from channel to channel to avoid a potential phase mismatch due to signal-propagation delays.

The same type of Thor Labs telecommunication VCSELs was used in the multichannel as in the single-channel λC. This presented an obstacle to emulation of a very nearly production-style version of a multichannel prototype, as the large size of the "TO" cans housing the VCSELs limited minimum spacing between VCSELs to 0.200 inch.

This meant that even though there was only 250 μm spacing between elements in the InGaAs detector, there was a significant dead space between VCSEL emitter elements. The 0.2-inch spacing also limited the number of channels visible on the streak tube to eight.

People skilled in this field, however, will understand that the difference in spacing is in the main only cosmetic, provided that interchannel crosstalk at the VCSEL output is fully assessed at some other stage of the development. Moreover, the wide spacing between VCSEL beams also had a positive implication, offering an opportunity to watch parallel performances of the multiple individual VCSELs in isolation.

The multichannel unit was tested using a doubled Nd:YAG laser with an 8 ns pulse generating approximately 1.80 W of average power at λ 532 nm and 1.20 W at λ 1064 nm. Pulse repetition frequency was 200 Hz.

Figure 15:
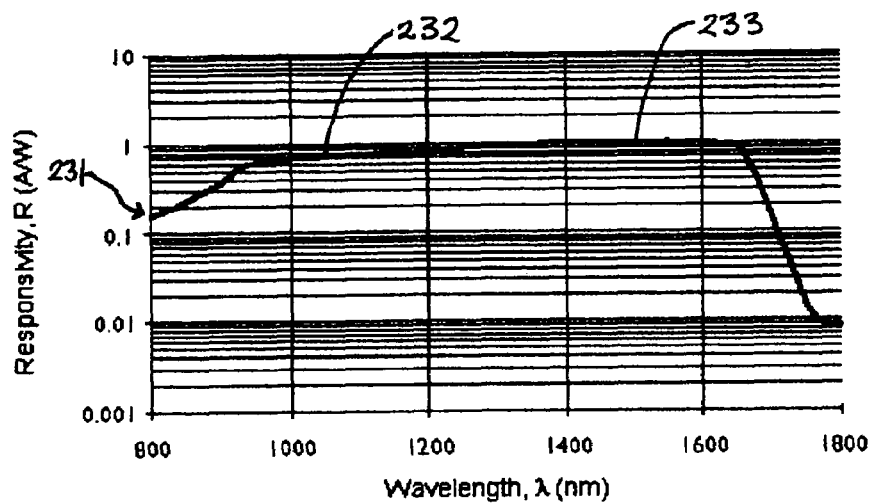
FIG. 15 is a spectral-response curve for InGaAs.

The responsivity 232 (FIG. 15) of the InGaAs sensors to 1064 nm is about 3 db reduced from responsivity 232 at 1500 nm. The response (off-scale, 231) of the InGaAs detectors to λ 532 nm visible light is about 8.5 dB lower still. In addition, the λC board physically blocked the visible light from reaching the streak tube, so images were from the λ 1064 nm light only.

Figure 16:
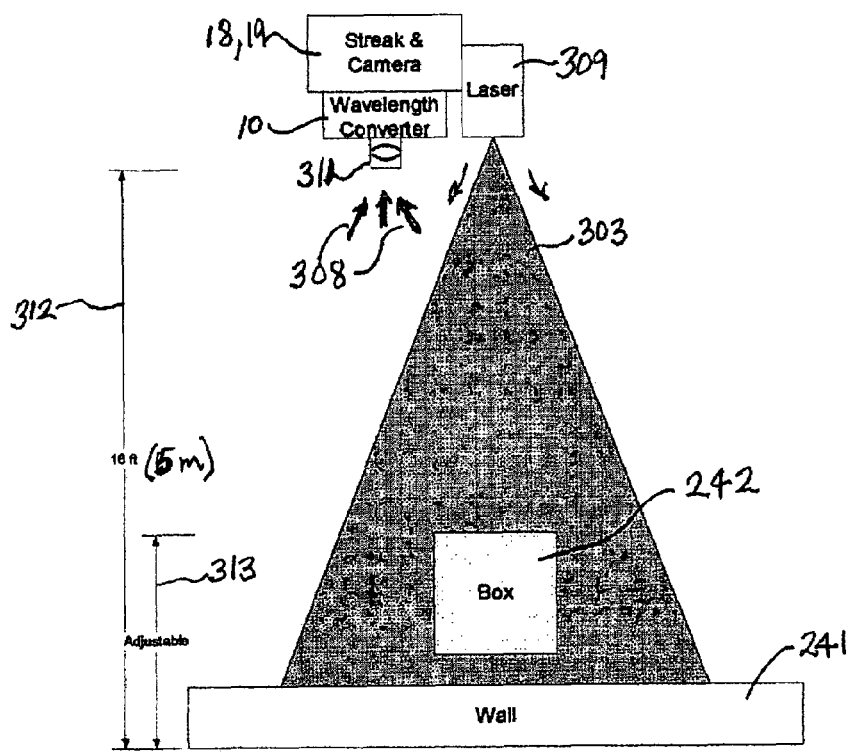
FIG. 16 is a diagram of a multichannel test setup for imaging a box in front of a wall.

The beam from a source laser 309 (FIG. 16) was projected through a Fresnel lens (not shown) to produce a fan beam 303 parallel to the focal plane of the detector array 13 (FIG. 2) in the λC (FIG. 16). The λC collection optics consist of a 12.0 mm f/1.3 lens 311 positioned approximately 1 cm in front of the array element. The 12.5 mm FOV of the lens roughly approximates the horizontal expansion of the fan beam 303.

Figure 17:
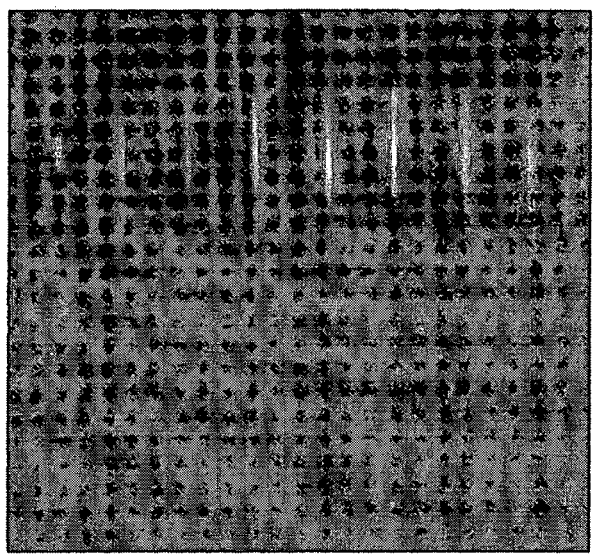
FIG. 17 is a multichannel streak image of the FIG. 16 wall alone, i. e. without the box, and showing multiple returns from a twelve-pixel prototype system.

Our lidar test objects included a wall 241, at a distance 312 of about 5 m (sixteen feet) from the λC, and also a cardboard box 242 at an adjustable distance 313 in front of the wall. Resulting streak images (FIG. 17) of the wall alone clearly show the individual channels of the wavelength converter.

As noted earlier, even though the spacing of the detector elements is 250 μm, the physical dimensions of the VCSEL "TO" cans cause the optical emitters to be separated by about 0.2 inch per channel. This separation on the streak faceplate results in the return being segregated into distinct rows, and the dimensions of the streak faceplate limit viewing to only eight channels.

Figure 18:
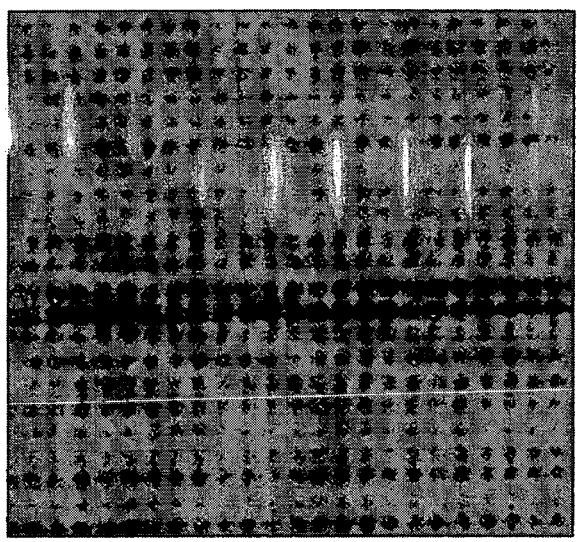
FIG. 18 is a like image captured with the box present, and two feet from the wall (higher reflectivity of the cardboard is indicated here by increased brightness of the return pulses)
Figure 19:
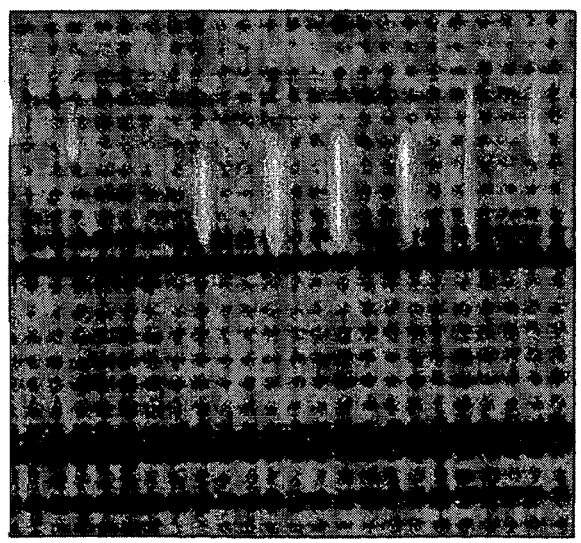
FIG. 19 is a like image with the box four feet from the wall.

With the cardboard box 242 (FIG. 16) positioned at a distance 313 of roughly 0.6 m (two feet) in front of the wall (roughly 3.4 m or fourteen feet from the wavelength converter), resulting lidar images (FIG. 18) immediately show very different responses. Clearly the system is indicating a closer object across part of the cross-track field. In our test images (FIGS. 17 through 19), range is presented from bottom to top: i. e. lower in these images is closer to the source.

In addition to vertical displacement, the images correctly indicate a higher reflectivity of the cardboard surface 242 (FIG. 16) relative to that of the wall 241. This higher reflectivity is plain from the greater brightness (FIGS. 18 and 19) of the return pulses.

With the cardboard box moved forward to about 1.3 m (four feet) from the wall and thus closer to the lidar unit (roughly 4 m or twelve feet from the λC), the resulting images (FIG. 19) clearly follow the shift of the box. A significant increase in intensity of the return from the now-closer cardboard box is actually sending the current drivers into saturation and inducing a ringing in the output. This ringing results in a greater pulse length (height) for this return.

Figure 20:
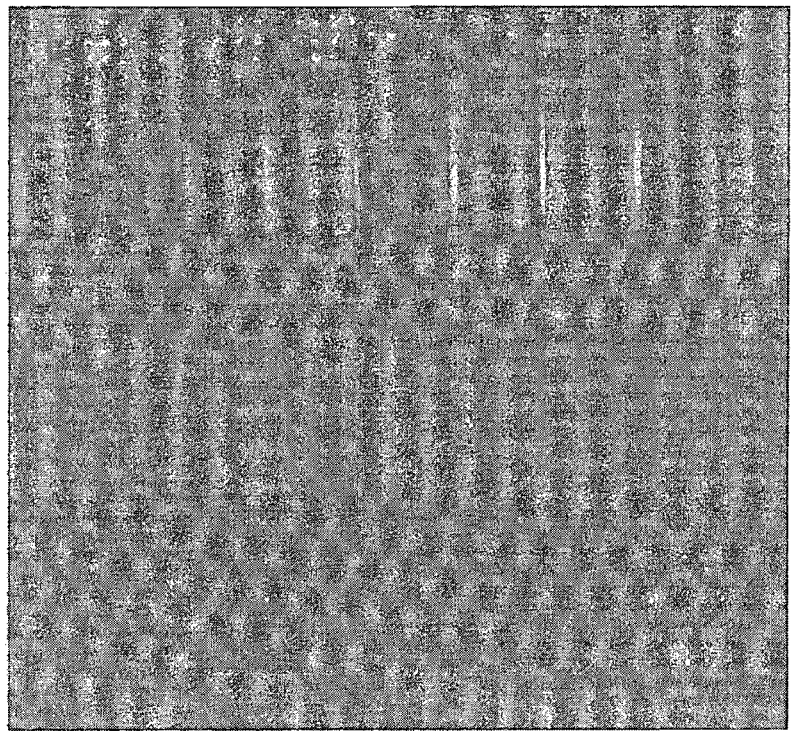
FIG. 20 is an image very generally like FIG. 18 but with a translucent object (window screen) in front of the wall, substituted for the box—and with the background electronically subtracted.
Figure 21:
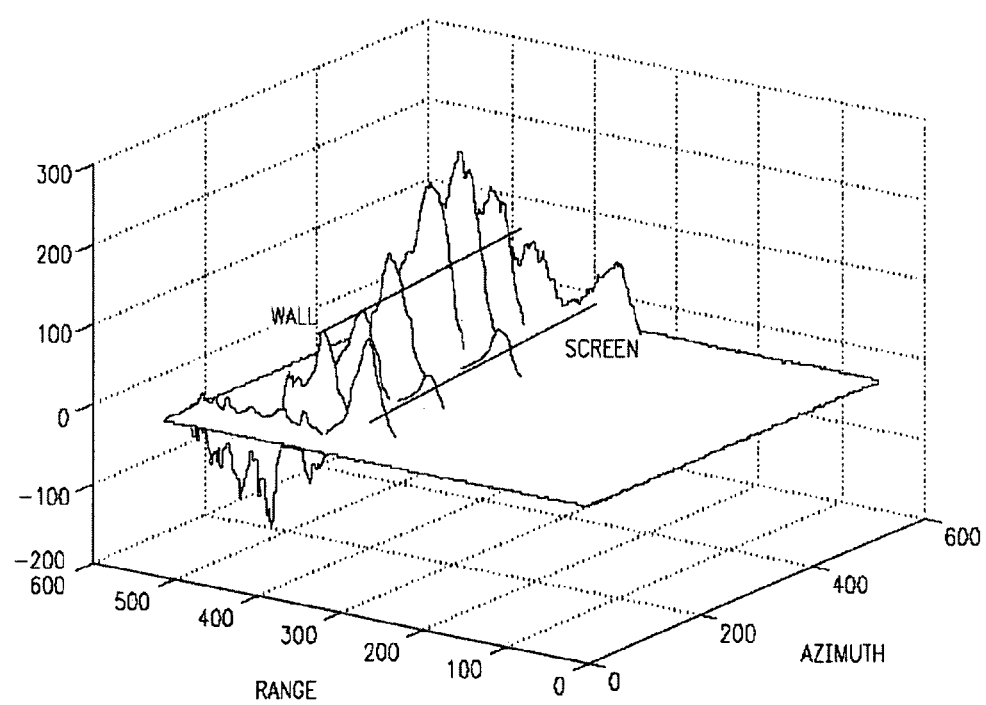
FIG. 21 is a mesh plot of streak return from a screen in front of a wall—showing both the strong return from the solid wall and the weaker signal from the screen

In another test we substituted a translucent object (window screen) for the box, in the imaging path between the lidar unit and the wall. This allowed us to capture returns from the partial reflection by the screen (fainter, lower pulses, FIG. 20) while still seeing the wall behind it. These accomplishments are shown more explicitly by a mesh plot (FIG. 21) of streak return from the screen in front of the wall, as well as the wall itself.

k) Twelve-Pixel System Design

Electronics subsystem—The twelve-pixel λC should be built using commercially available VCSEL and detector arrays. In fact the array dimension of twelve is based upon commercial availability.

The primary commercial application for VCSEL arrays is in short-haul communications. These already existing structures can abbreviate development time and reduce the cost of testing the intermediate design.

It is recommended to use an InGaAs detector array that is commercially available. Custom electronics, but well within the state of the art, are to be designed—including the transimpedance and transconductance amplifiers.

The circuit design discussed earlier (FIG. 4) can be replicated to drive the twelve VCSELs. To assure high bandwidth, all components are best made surface-mount types, with strict attention to transmission-line lengths and control of stray capacitance and inductance.

PSPICE® circuit emulation, available as software from Cadence Design Systems, Inc. of San Jose, Calif., is a recommended design support tool prior to board fabrication. We found that its use minimized errors-in layout and operation.

Optical subsystem—The optics must focus backscattered radiation onto the detector array and deliver the output of the VCSEL array to a streak-tube receiver. Optics to deliver the backscattered light are ideally in the form of a simple telescopic lens system that has high throughput near 1.5 μm.

Because the twelve-element array will be quite short (3 mm) and have few pixels, it is possible to butt-couple (i. e. abut) VCSEL outputs directly to the fiber taper input of the streak-tube receiver. The pixel pitch of the VCSELs should be adequate to minimize channel crosstalk after that coupling is achieved efficiently.

An alternative approach is to use a fiber-coupled VCSEL array and abut the fibers directly to the streak-tube input. The freedom to move each fiber independently will enable complete elimination of crosstalk.

One ideal laser for this system is an Nd:YAG unit coupled to an optical parametric oscillator to provide output at 1.5 µm. An optical pulse slicer is recommended to enable tailoring of pulse widths in the range from 1 nsec up to the normal laser pulse width of 10 nsec.

A suitable streak-tube lidar receiver is a Hamamatsu C4187 system coupled to a DALSA 1M60 CCD camera. We have used such a system in multiple STIL programs and find that it provides a solid foundation on which to build experience with the λC.

Data acquisition—A useful data-acquisition system for this purpose is based on a commercially available frame grabber and a PC configured to capture and store the images. To minimize peripheral development time and cost it is advisable to obtain access to a suitable software library.

Laboratory measurements/subsystem test—Each individual pixel of the array should be independently tested for functionality, ascertaining the sensitivity and bandwidth of each channel using tests similar to those described above for the single-pixel system. The λC should then be coupled to the streak tube, and alignment and calibration completed.

Calibration should include measuring the uniformity of the various channels so that these variations can be taken out of subsequent lidar images. In addition, the dynamic range of the system should be assessed using a calibrated set of neutral-density filters. Our prototype efforts included both these components.

Twelve-pixel imaging-lidar lab measurements—Several tests should be run to characterize the performance of the λC in a STIL system. Initial tests ideally should involve simple flat-field images using objects of varying contrast spaced apart from each other in range. Such testing is important to quantify the contrast and range measurement capabilities.

A second test should determine the range resolution of the system. In this test the two objects should be moved closer and closer together until the respective returns from the two can no longer be discriminated. This procedure should be repeated for a variety of laser pulse widths and streak-camera settings.

The resolution with which the distance between two partially transmissive objects can be measured should also be determined. Ordinary window screen serves admirably as test objects in this test.

Finally, larger scale (more than twelve-pixel) imagery should be generated by simultaneously scanning the transmitted beam and the receiver field of view with a large mirror to allow full three-dimensional imagery to be collected when the pushbroom sensor is stationary.

The tests discussed above will provide a design team with experience and knowledge of the parts of the system that are sensitive to component tolerances and the like. It is particularly essential to take this opportunity to identify the most qualified and cost-effective available vendors for the much more difficult stage of development that follows.

l) Two-hundred-fifty-six-pixel System Design

Specifications to guide a design effort—Design of a two-hundred-fifty-six-pixel system is significantly more complex than that of a twelve-pixel system. With the expertise developed in the dozen-pixel prototype, a design team can proceed much more confidently and with fewer detours.

This effort should encompass design of a λC with imaging capabilities that can meet real-world objectives. The accompanying table contains lidar system specifications to drive such a design effort.

| parameter | value | comment |
|---|---|---|
| λC receiver bandwidth | 1.5 GHz | |
| λC crosstalk | <−30 dB | channel to channel |
| λC power consumption | <10 W | |
| transmitted wavelength | 1.54 mm | |
| VCSEL emission wavelength | 600–850 nm | |
| angular resolution (IFOV) | 250 mrad crosstrack | 7.5 cm at 300 m standoff |
| FOV | 64 mrad crosstrack | |
| range resolution, $\Delta R$ | variable 200 m maximum 7.5 cm minimum | |
| range extent, $R_E$ | $100 \times \Delta R$ | |
| absolute range precision | $\pm 2 \Delta R$ | defined as the required measurement accuracy of the distance from the sensor to the first return of a single shot |
| pulse repetition frequency | 200 Hz maximum | |
| operating temperature | −10 to 45 C. | |

Detector array—The detector array will be a two-hundred-fifty-six-element PIN InGaAs device. Three possible vendors of such arrays are known to us: Sensors Unlimited, Hamamatsu, and AXT.

It is advisable to collaborate with vendors to determine the best possible configuration for the λC and finalize the design. The array is advisably flip-chip bonded, as outlined earlier, to preserve the bandwidth of the detector and minimize the physical extent of the connection.

It is also advisable to bump-bond the array to a submount assembly that will support both the VCSEL and the detector array. A set of transmission lines should interconnect the detector array and the amplifier array.

Transimpedance amplifier array—Here too it is recommended to work closely with IC design and process specialists to identify the best process for the custom chip or chips to achieve the required combination of a low noise transimpedance amplifier, adequate bandwidth, a suitable gain stage, and output buffering to drive the VCSEL array. The design from COTS components used on a circuit card should then be converted into devices that are readily fabricated in IC form with the process chosen.

As noted above, a PSPICE® model should be developed in advance to show that the design, when implemented in this fashion, provides the performance required. It is preferable to consider the system aspects of the design including packaging and thermal modeling. A final system layout for fabrication at a foundry should be reserved for a later stage of development, but the two-hundred-fifty-six-pixel effort will confirm that the work is on track and provide a clear path to the foundry later.

VCSEL array—VCSEL arrays are currently being produced in a large number of various formats. The VCSEL array will be two hundred fifty-six elements with a device pitch of ~250 µm.

Four commercial vendors are among known entities capable of producing the VCSEL array that is necessary: Honeywell, Emcore, ULM Photonics and AXT. All have significant expertise in delivering custom VCSEL arrays.

It is also advisable, however, to consider collaboration in addition, or instead, with university-based academic specialists in this area. Such coventurers are likely to provide greater flexibility in accommodating the special requirements of the λC/STIL approach without overregard for the high production volumes that drive more-conventional commercial applications.

The invention is not limited to using VCSELs. The emitters may instead comprise edge-emitting lasers, or quantum diodes or dots, or MEMS devices.

Cross-track sampling—Our use of discrete detectors, in front of the slit of the streak tube, in effect samples the image plane of the receiver—as compared with conventional STIL apparatus and operation, in which the cross-track image at the photocathode is substantially continuous. One must assure that the sampling has ample resolution to reconstruct the images desired in the lidar receiver.

This effect is not overly complex, and a closely analogous phenomenon conventionally occurs anyway at the output end of the streak tube. There a multiple-discrete-element CCD array, used to capture the output range-azimuth image that appears on the phosphor, necessarily imposes a quantizing or discretizing effect.

A secondary effect of the discrete detectors is an effective reduction in the fill factor of the receiver. This problem can significantly degrade the performance of the system with respect to the more-traditional mode of operation. Such a limitation can be overcome through the use of a microlens array that can be attached or integrated directly onto the detector array. Such a practice is common in CCD and CMOS imaging devices as well as in detector arrays designed for communications and spectroscopic applications.

m) Representative Systems

Merely by way of example, one of myriad uses may involve an aircraft 101 (FIG. 13), serving as part of the inventive apparatus, that translates 104 the STIL system 100 in the so-called "pushbroom" pulsed mode over or next to objects in a scene 105 to be imaged. While in motion 104, the system forms both the downward- or sideward-transmitted near-infrared pulses 103 and the reflected or back-scattered near-infrared pulses 8 within a thin-fan-shaped beam envelope 102.

(It will be understood that the return pulses actually are scattered in essentially all directions. The receiver optics, however, confine the collection geometry to the fan shape 102.)

The aircraft 101 may, further as an example, be searching for a vehicle 109 that has gone off the road in snowy and foggy mountains 108. A person 107 in the mountains may be looking 106 directly at the aircraft and into the transmitted STIL beam pulses, but is not injured by the beam because it is near-IR rather than visible.

The interpretive portions 91-94 of the apparatus may also include a monitor 99 that displays an image 98 of the scene 105 for viewing by a person 97 within the aircraft—even though the scene 105 itself might be entirely invisible to direct human view, obscured by fog or clouds (not shown). Viewing may instead, or in addition, be at a base station (not shown) that receives the results of the data-processing system by telemetry 95.

The primary data processing 91, 92 advantageously produces an image 98 for such viewing—preferably a volume-equivalent series of two-dimensional images as taught in the pushbroom art, including the earlier-mentioned previous patent documents of Areté Associates. In addition the system preferably includes automatically operated interpretive modules 94 that determine whether particular conditions are met (here for example the image-enhanced detection of the vehicle sought), and operate automatic physical apparatus 95, 96 in response.

For example, in some preferred embodiments detection of the desired object (vehicle 109) actuates a broadcast announcement 96. These interpretive and automatically responsive modules 91-96, 99, however, are only exemplary of many different forms of what may be called "utilization means" that comprise automatic equipment actuated when particular optically detected conditions are met.

Others include enabling or denying access to secure facilities through operation of doors and gates, or access to computer systems or to financial services such as credit or banking. Determination of hostile conditions, and resulting security measures such as automatically deployed area-sealing bulkheads, is also within the scope of the invention—as for instance in the case of safety screening at airports, stadiums, meeting halls, prisons, laboratories, office buildings and many other sensitive facilities.

Because the NIR beam is eye-safe, the entire system can be operated at close range to people and in fact can be used harmlessly to image people, including their faces, as well as other parts of living bodies e. g. for medical evaluations, as also taught in the earlier patent documents mentioned above. The elements of the environment 105, 107-109 and of automatically operated response 94-96 that are shown shall be regarded as illustrations of all such other kinds of scenes for imaging, and the corresponding appropriate responses, respectively.

The invention is not limited to pushbroom operation, but rather can be embodied in e. g. flash systems. It will be understood, however, that the pushbroom mode makes the most—in terms of resolution or image sharpness—of comparatively modest resources.

In particular, relatively fixed available imaging length and area are available at any streak-tube photocathode and phosphor screen, respectively. It follows that if an entire scene is re-mapped into a single slit image for streaking, then necessarily only a far tinier sampling of each part (e. g. raster line) of the scene can be taken.

Figure 13:
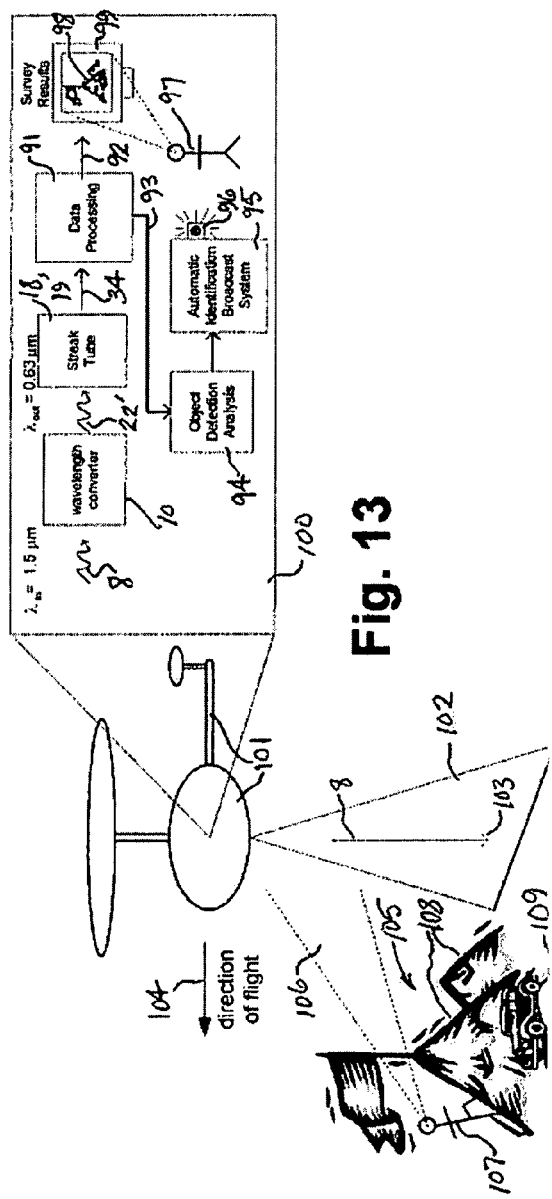
FIG. 13 is a diagram, very highly schematic, showing one of many prospective uses of preferred embodiments of the invention—particularly including an aircraft containing and translating the apparatus in the so-called "pushbroom" pulsed mode, over objects to be imaged in eye-safe mode.
Figure 14:
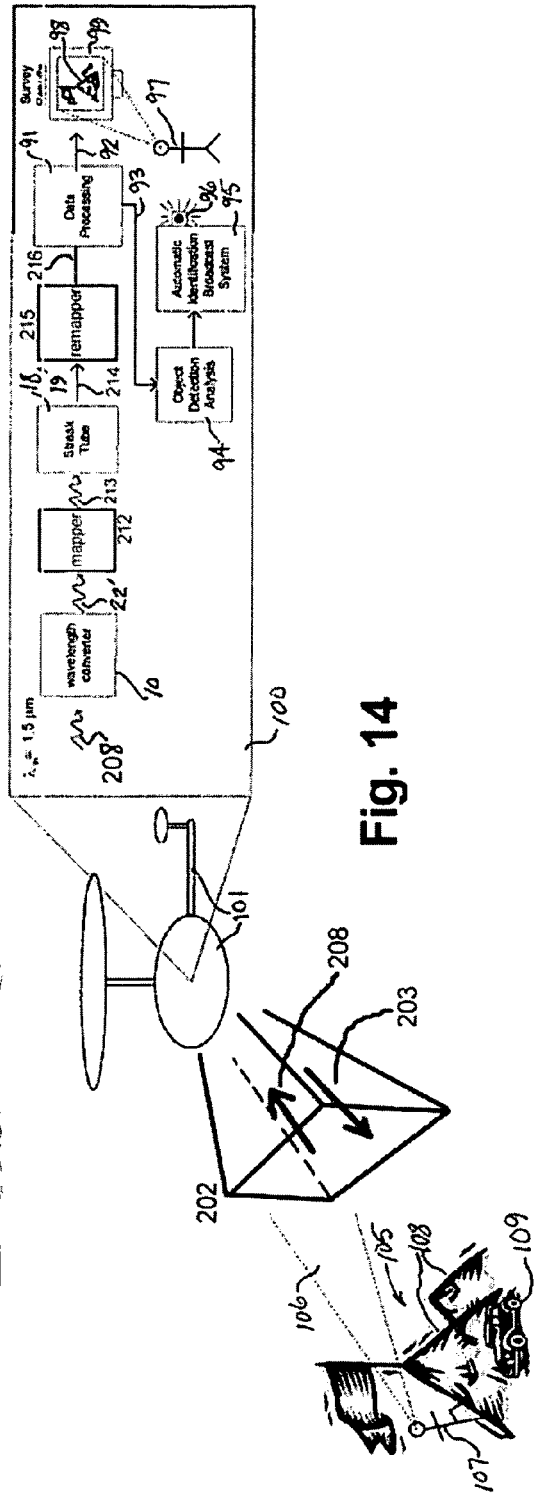
FIG. 14 is a like diagram for the so-called "flash" mode.

In a flash system what is projected 203 (FIG. 14) and returned 208 can be a single rectangular-cross-section beam 202, rather than a succession of fan beams 102 (FIG. 13). The aircraft 101 may hover, rather than necessarily moving forward at some pace related to frame acquisition, and may be a lighter-than-air craft if desired.

As in the pushbroom system, however, the wavelengths of transmitted and recovered pulses 203, 208 (FIG. 14) are not in the visible part of the spectrum; for many applications they are in the near-IR, but as noted earlier they can be in the infrared or ultraviolet as appropriate to the application. All the illustrations in this document are expressly to be seen as representative of all such different wavelength embodiments.

Following the λC 10 in a flash system is a mapper 212 that rearranges elements (e. g. pixels) of the image captured by the λC 10. The mapper 212 may take the form of a fiber-optic prism that is sliced, as described in the earlier-mentioned Knight or Alfano patents, to place successive raster lines of the image 22' end-to-end and thereby form a single common slit-shaped image 213.

For purposes of the present invention, in purest principle the mapping may instead be accomplished within the λC, by rerouting electrical connections at some point between the individual detectors 13 and the individual VCSELs (or other emitters) 16. Such an arrangement poses a major challenge to maintaining minimum reactances throughout the system—and especially uniform reactances as between the multiple channels.

People skilled in this field will recognize that such an effort is at odds with the advantageous properties of flip-chip bump-bonding, and perhaps even more with the common-epitaxy principles of the Coldren patent. Ingenuity in geometrical arrangements, however, may overcome these obstacles.

Following the streak tube 18, the flash-mode output image 214 may be regarded as garbled due to the mapper 212 and therefore requiring use of a remapper 215 to restore ordinary image properties of adjacency. This remapping can be accomplished in various ways. The most straightforward is ordinarily a computerized resorting of pixels in the output image 214, to unscramble the effects of the mapper 212.

n) Alternate Wavelength Applications

As noted earlier, the applicability of the invention is not at all limited to the near-infrared. One important area of use is the more-remote infrared, also a relatively difficult region for development of streak-tube photocathodes because of the even lower photon energy here than in the near-IR.

The infrared portion of the electromagnetic spectrum (3 to 12 μm) overlaps strong absorption features of many molecules. As a result wavelengths in this region are particularly attractive for monitoring gaseous contaminant concentrations such as those encountered in atmospheric pollution or industrial process control.

$CO_2$ lasers operating at 9 to 11 μm can produce large amounts of power and have been deployed in space for a number of applications. The wavelength converter ("λC") is well suited for use with $CO_2$-laser-based imaging lidar systems.

Even though photon energy in the ultraviolet is ample for development of streak-tube photocathode materials—and in fact such materials do exist—nevertheless the UV too offers fertile ground for applications of the present invention. Here the particular appeal of the present invention lies in the potential for imaging returns from wholly different spectral regions within a single, common streak tube; and if desired even at the same time.

Figure 24:
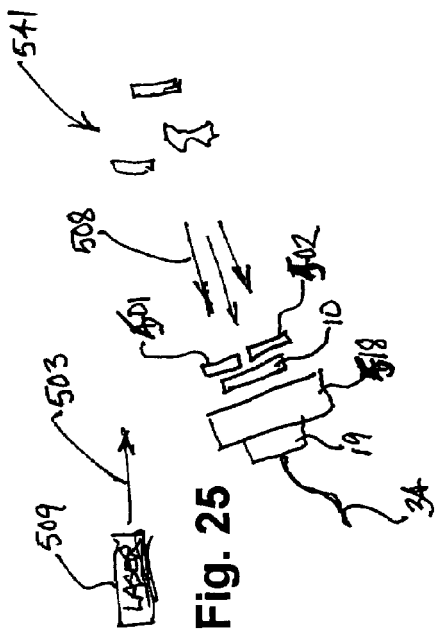
FIG. 24 is a conceptual block diagram showing the λC used in a time-sharing plural-wavelength-band lidar system.

For example two lasers 409a, 409b (FIG. 24) producing respective pulses 403a, 403b in different wavebands—or if preferred a single laser capable of emission in different bands—can be operated in alternation. The returns 408 from an object field 441 are directed to a single, common λC 10, which relays the optical signals to a streak tube 18, camera 19 and interpretive stages 34 just as before. This type of operation yields a time-shared system.

Here the converter 10 may have sufficiently uniform response in the two wavebands to enable operation of the camera system 18, 19, 34 for processing of both sets of returns 408. To enhance such capability the λC, the streak tube 18, or the back-end stage 19—or combinations of these—can be synchronously adjusted in sensitivity, electronically.

Figure 25:
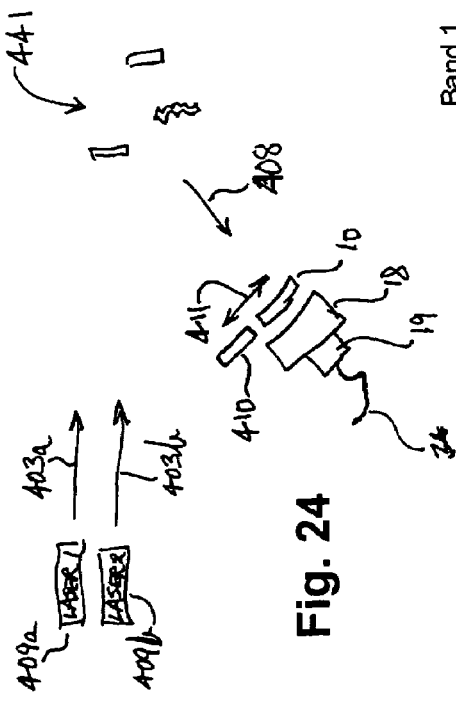
FIG. 25 is a like diagram for a spatial-sharing (plural-slit) plural-wavelength-band lidar system that uses filters to separate wavebands.

An alternative, acceptable in some applications involving relatively stationary object fields, is to collect a complete image or large portion of an image in one of the wavebands based on pulses 403a from one laser 409a; and then change over to collection of a comparable image or portion in the other waveband based on pulses 403b from the other laser 409b. In this case yet another alternative is shifting 411 of two or more converters 10, 410 into position in front of the streak tube 18—or, if preferred, retaining a single converter 10 in position while swapping optical filters (not shown) in front of that single converter 10.

Where time sharing is not acceptable or desirable, a spatially-shared system can be used instead. For this case the system advantageously uses a single laser 509 (FIG. 25) that can emit pulses 503 containing light in plural bands, or in particular plural spectral lines.

Here the return 508 from the object field 541 is likewise in plural optical bands, or at least lines. The streak tube 518 in this case advantageously has a plural-slit photocathode as described in the previously mentioned Gleckler patent document. Here e. g. one wavelength filter 501 is inserted in front of only just one part of the λC—while a second, different-wavelength filter 502 lies in front of another part.

For instance if just two wavebands or lines are in use, the two filters 501, 502 can be respectively inserted in front of the two ends of the converter array 10, which correspondingly feed optical signals into the two slits. If preferred, the two ends (or more generally plural parts) of a single streak-tube slit can be driven in this way and the lidar images separately interpreted downstream.

Figure 26:
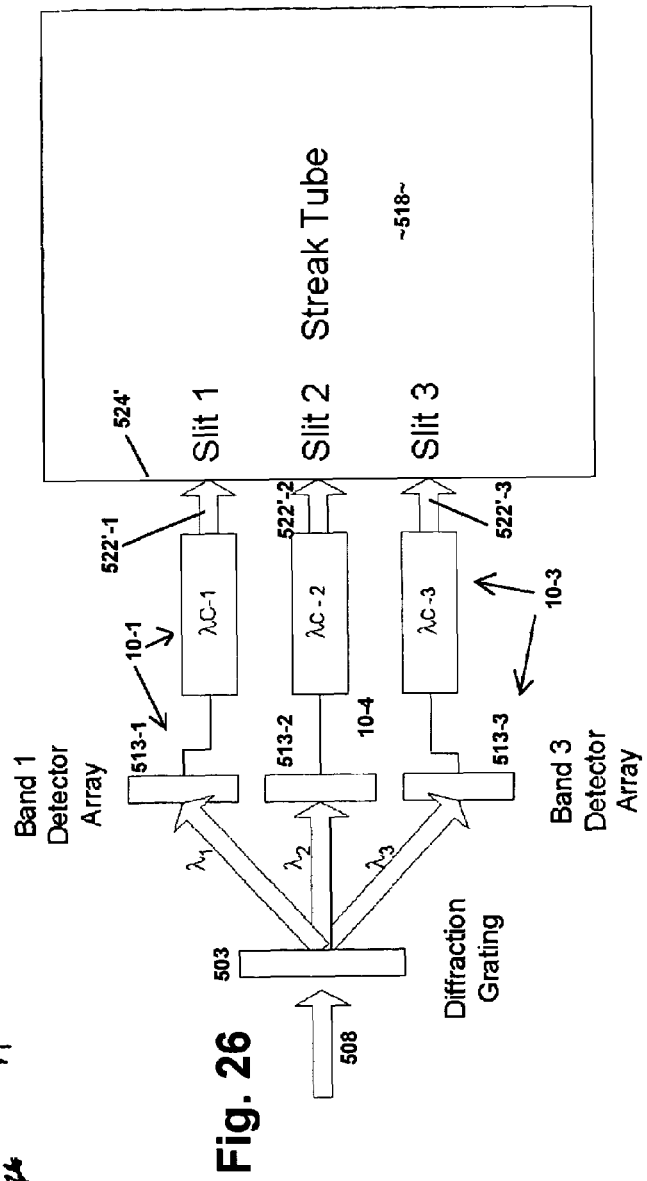
FIG. 26 is a like diagram of another spatial-sharing system that instead uses a diffraction grating.

Yet another option is to use two different λC sections (not shown), with different wavelength sensitivities, in lieu of a single converter 10—and generally without optical filters. A more-specific and more sophisticated implementation that better conserves optical-signal power uses a diffraction grating 503 (FIG. 26) instead of filters, to separate the wavebands of interest.

These plural separated wavelength bands $\lambda_1, \lambda_2, \ldots$ advantageously proceed to respective separate detector stages 513-1, 513-2, . . . which are the front-end stages of respective separate wavelength converters 10-1, 10-2 . . . . These in turn respectively provide optical signals 522'-1, 522'-2, . . . to plural slits (Slit 1, Slit 2, . . .) at the photocathode 524' of the streak tube 518. As will now be appreciated, many mix-and-match options are possible with respect to the specific components and modalities shown in the plural-waveband configurations (FIGS. 24 through 26) discussed here.

By capturing images in a single streak tube concurrently, using any of the systems under discussion (FIGS. 24 through 26), the invention enables the interpretive parts 34 of the system to develop difference signals, or ratio signals, as between the plural spectral regions. In this way the invention becomes a system capable of, for example, differential-intensity, or differential-absorbance, lidar spectroscopy as between, e. g., the far-IR and the UV—or other such combinations of spectral regions.

o) Claiming Notes

In accompanying apparatus claims generally the term "such" is used (instead of "said" or "the") in the bodies of the claims, when reciting elements of the claimed invention, for referring back to features which are introduced in preamble as part of the context or environment of the claimed invention. The purpose of this convention is to aid in more particularly and emphatically pointing out which features are elements of the claimed invention, and which are parts of its context—and thereby to more distinctly claim the invention.

The foregoing disclosure is intended to be merely exemplary, and not to limit the scope of the invention—which is to be determined by reference to the appended claims.

p) References:

1. Gleckler, Anthony D., and A. Gelbart, "Three-dimensional imaging polarimetry," Laser radar technology and applications VI, *Proceedings of SPIE* Vol. 4377, Aerosense (Florida 2001)

2. Gelbart, Asher, "Flash lidar based on multiple-slit streak tube imaging lidar", Laser Radar Technology and Applications VII, *Proceedings of SPIE* Vol. 4723, Aerosense (Florida 2002)
3. Costello, Kenneth A., Verle W. Aebi, Gary A. Davis, Ross A. La Rue, and Robert E. Weiss, "Transferred electron photocathode with greater than 20% quantum efficiency beyond 1 micron", *Photodetectors and Power Meters II* at 177-88, editors Kathleen Muray and Kenneth J. Kaufmann (San Diego Jul. 9-14, 1995)
4. Calmes, Lonnie K., James T. Murray, William L. Austin, and Richard C. Powell, "Solid-State Raman Image Amplification," *Proceedings of SPIE* Vol. 3382 (1998)
5. Bowker, Kent, and Stephen C. Lubard, "Displaced-beam confocal-reflection streak lidar apparatus with strip-shaped photocathode, for imaging very small volumes and objects therein", U.S. Pat. No. 6,400,396 (2002)
6. McLean, J. W., and J. T. Murray, "Streak tube lidar allows 3-D surveillance," *Laser Focus World* at 171-76 (January 1998)
7. Francis, D., H. L. Chen, W. Yuen, G. Li, and C. Chang Hasnain, "Monolithic 2D-VCSEL array with >2W CW and >5W pulsed output power," *Electronics Letters* Vol. 34, 2132 (1998)
8. Fujixerox online product literature http://www.fujixerox.co.jp/eng/product/vcsel/overview.html (January 2003)
9. Honeywell online product literature http://content.honeywell.com/vcsel/capabilities/monolithic.stm (January 2003)

What is claimed is:

1. Apparatus for detecting objects and determining their distance, to form a two-dimensional or three-dimensional image; said apparatus comprising:
   means for receiving light pulses, having pulse width in at least part of the range between one and ten nanoseconds, scattered from such objects;
   means, responsive to the receiving means, for forming and emitting corresponding light pulses of a different wavelength from the scattered light;
   discrete electronic or other hardware components interconnecting the receiving means with the forming means; and
   means for accepting the emitted corresponding light pulses that have left the forming means, and for distributing successive temporal components of said accepted light pulses in a nontemporal domain, to time-resolve the accepted corresponding light pulses to determine respective distances of such objects.

2. The apparatus of claim 1, further for use in determining reflectance of the objects; and wherein the receiving means and the forming means:
   comprise means for measuring and recording gray-level information in the received and formed light; and
   are capable of operating at bandwidth exceeding fifty megahertz.

3. Apparatus for detecting objects and determining their distance, to form a two-dimensional or three-dimensional image; said apparatus comprising:
   means for receiving light scattered from such objects;
   means, responsive to the receiving means, for forming a corresponding light of a different wavelength from the scattered light; and
   means for time-resolving the corresponding light to determine respective distances of such objects;
   wherein the receiving means and the forming means comprise, respectively:
   a first, optointermediate stage that receives the scattered light and in response generates a corresponding intermediate signal; and
   a second, intermedioptical stage that receives the intermediate signal and in response forms the corresponding light; and
   means for applying gain at one or more of these locations:
   the first stage,
   the second stage, and
   between the first and second stages.

4. The apparatus of claim 3, wherein:
the intermediate signal comprises an optical signal.

5. The apparatus of claim 3, wherein:
the time-resolving means comprise a streak lidar device.

6. The apparatus of claim 3, further comprising:
a light source; and
means for projecting pulses of light from the source toward such objects for scattering back toward the receiving means.

7. The apparatus of claim 3, wherein:
the streak lidar device is incorporated into a repetitively pulsed pushbroom system.

8. The apparatus of claim 7, further comprising:
an aircraft or other vehicle transporting the receiving means, and the forming means, and the streak lidar device relative to such objects.

9. The apparatus of claim 5, wherein:
the streak lidar device comprises a multislit streak tube.

10. The apparatus of claim 3, wherein:
the time-resolving means comprise a flash lidar system.

11. The apparatus of claim 3, wherein:
the intermediate signal comprises an electronic signal;
the first stage comprises an optoelectronic stage; and
the second stage comprises an electrooptical stage.

12. The apparatus of claim 11, wherein:
the optoelectronic stage comprises light-sensitive semiconductor devices.

13. The apparatus of claim 12, wherein:
the semiconductor devices comprise PIN diodes.

14. The apparatus of claim 12, wherein:
the semiconductor devices comprise avalanche photodiodes.

15. The apparatus of claim 13, wherein:
the electrooptical stage comprises vertical-cavity surface-emitting lasers or other collimated-emission devices, connected to receive the electronic signal from the PIN diodes.

16. The apparatus of claim 13, wherein:
the electrooptical stage comprises devices selected from the group consisting of:
   edge-emitting lasers,
   quantum diodes, and
   quantum-dot lasers;
said devices being connected to receive the electronic signal from the PIN diodes.

17. The apparatus of claim 11, wherein:
the electrooptical stage comprises collimating optical emitters connected to receive a signal from the optoelectronic stage.

18. The apparatus of claim 3, further comprising:
utilization means responsive to the time-resolving means.

19. The apparatus of claim 18, wherein the utilization means are selected from the group consisting of:
   interpretive means for characterizing such objects based on the time-resolved light;
   a monitor that displays an image of such objects for viewing by a person at the apparatus;

a monitor at a base station for reviewing such objects or related data received from the resolving by means by telemetry;

a data-processing device for analyzing such objects or images of them;

automatically operated interpretive modules that determine whether particular conditions are met;

announcement-broadcasting means or other automatic physical apparatus connected to operate in response to the time-resolving means;

means for enabling or denying access to secure facilities through operation of doors and gates, or access to computer systems or to financial services including but not limited to credit or banking;

means for determination of hostile conditions, and resulting security measures including but not limited to automatically deployed area-sealing bulkheads.

20. The apparatus of claim 3, wherein:
the receiving means and forming means comprise discrete arrays of light-sensing and light-producing components respectively.

21. The apparatus of claim 20, further comprising:
a discrete array of circuitry for controlling the forming means in response to the receiving means.

22. The apparatus of claim 3, wherein:
the receiving means and forming means respectively comprise at least one monolithic hybrid of light-sensing and light-producing components.

23. The apparatus of claim 22, wherein:
the monolithic hybrid further comprises circuitry for controlling the forming means in response to the receiving means.

24. A method for detecting and ranging objects, said method comprising the steps of:
receiving light pulses, having pulse width in at least part of the range between one and ten nanoseconds, scattered from such objects;
in response to the scattered light, forming corresponding light pulses of a different wavelength from the scattered light;
said receiving step and said forming step being performed in respective discrete electronic components or other hardware components; and
time-resolving the corresponding light to determine respective distances of such objects;
said time-resolving step defining a time interval, for time-resolution of the corresponding light, of one hundred microseconds' duration, or within an order of magnitude thereof; and
said receiving step and said forming step being substantially capable of continuous operation throughout said time interval.

25. A method for detecting and ranging objects, and determining their reflectance, said method comprising the steps of:
receiving light pulses, having pulse width in at least part of the range between one and ten nanoseconds, scattered from the objects;
in response to the scattered light, forming corresponding light pulses of a different wavelength from the scattered light; and
time-resolving the corresponding light to determine respective distances of such objects;
said time-resolving step defining a time interval, for time-resolution of the corresponding light, between twenty-five nanoseconds and one hundred microseconds long; and
said receiving step and said forming step being substantially capable of continuous operation throughout said time interval, and being performed in respective discrete electronic or other hardware components; and wherein:
the receiving step preserves at least some gray-level information in the scattered light; and
the forming step also preserves at least some of the gray-level information.

26. A method for detecting and ranging objects, said method comprising the steps of:
receiving light scattered from the objects;
in response to the scattered light, forming a corresponding light of a different wavelength from the scattered light; and
after the forming step, time-resolving the corresponding light to determine respective distances of such objects; wherein:
the receiving step receives the scattered light in plural wavelength bands in the infrared, near-infrared or visible, or combinations of these; and
the forming step forms the corresponding light in substantially a single, common visible wavelength band.

27. The method of claim 26:
further comprising the step of, before the receiving step, transmitting light in plural wavelength bands, substantially simultaneously, toward the objects;
wherein the receiving and forming steps comprise receiving said scattered light in each one of the plural wavelength bands and forming respective plural corresponding lights of respective different wavelengths; and
further comprising the step of accepting the plural corresponding lights of respective different wavelengths at plural slits, respectively, of a plural-slit streak camera.

28. The method of claim 26:
further comprising the step of, before the receiving step, transmitting light in said plural wavelength bands, at respective plural times, toward the objects; and
wherein the receiving step includes receiving the plural wavelength bands at plural times, respectively.

29. A method for detecting and ranging objects, said method comprising the steps of:
receiving light scattered from the objects;
in response to the scattered light, forming a corresponding light of a different wavelength from the scattered light; and
time-resolving the corresponding light to determine respective distances of such objects; wherein:
the receiving step receives the scattered light in plural wavelength bands, and
the forming step forms the corresponding light in substantially a single, common wavelength band;
deriving plural signals from the received light in the plural wavelength bands, respectively; and
finding differences or ratios between signals received in the plural wavelength bands.

30. Apparatus for detecting objects and determining their distance and reflectance, to form a two-dimensional or three-dimensional image; said apparatus comprising:
a light source;
means for projecting pulses of light from the source toward such objects for scattering by such objects;
means for receiving light scattered by such objects and in response forming a corresponding light of a different wavelength from the scattered light, preserving gray-level information in said received and corresponding light;

means, comprising a streak camera, for time-resolving the corresponding light to determine respective distances and reflectances of such objects;

wherein the receiving-and-forming means comprise:

a first, optoelectronic stage comprising an array of light-sensitive PIN diodes, that receives the scattered light and in response forms a corresponding electronic signal;

a second, electrooptical stage comprising an array of vertical-cavity surface-emitting lasers connected to receive the electronic signal from the PIN diodes, that receives the electronic signal and in response forms the corresponding light; and an electronic circuit array connecting the electronic signal from the first stage to the second stage, and modifying the signal to operate the second stage.

31. The apparatus of claim 30, wherein:
the streak lidar device is incorporated into a repetitively pulsed pushbroom system.

32. The apparatus of claim 31, further comprising:
an aircraft or other vehicle transporting the receiving-and-forming means and the streak lidar device relative to such objects.

33. The apparatus of claim 32, further comprising:
utilization means responsive to the time-resolving means.

34. The apparatus of claim 1, wherein:
the accepting and distributing means comprise means for time-resolving the accepted corresponding light after that corresponding light is formed and emitted.

35. The apparatus of claim 3, wherein:
the time-resolving means operate to time-resolve the corresponding light after the forming means form that corresponding light.

36. The method of claim 24, wherein:
the time-resolving step occurs after the forming step.

37. The method of claim 26, wherein:
the time-resolving step occurs after the forming step.

38. The apparatus of claim 1, further comprising:
a light source generating light pulses having said pulse width in at least part of the range between one and ten nanoseconds; and
means for projecting said pulses, having said pulse width, from the source generally toward such objects for scattering from such objects toward the receiving means.

39. The apparatus of claim 38, wherein:
the generated light pulses comprise light of a first wavelength; and
said different wavelength of the corresponding light is shorter than said first wavelength.

40. The apparatus of claim 38, wherein:
the receiving means and the forming means operate at bandwidth as high as at least fifty megahertz.

41. The apparatus of claim 1, wherein:
the receiving means and the forming means operate at bandwidth as high as at least fifty megahertz.

42. The apparatus of claim 3, wherein:
the scattered light pulses comprise light of a first wavelength; and
said different wavelength of the corresponding light is shorter than said first wavelength.

43. The apparatus of claim 24, further comprising:
a light source generating pulses of light, having said pulse width in at least part of the range between one and ten nanoseconds; and
means for projecting said pulses, having said pulse width, from the source generally toward such objects for scattering from such objects toward the receiving means.

44. The apparatus of claim 24, wherein:
the scattered light comprises light of a first wavelength; and
said different wavelength of the corresponding light is shorter than said first wavelength.

45. The apparatus of claim 25, further comprising:
a light source generating pulses of light, having said pulse width in at least part of the range between one and ten nanoseconds; and
means for projecting said pulses, having said pulse width, from the source generally toward such objects for scattering from such objects toward the receiving means.

46. The apparatus of claim 45, wherein:
the generated light pulses comprise light of a first wavelength; and
said different wavelength of the corresponding light is shorter than said first wavelength.

* * * * *